(12) United States Patent
Knoppert et al.

(10) Patent No.: US 11,106,772 B2
(45) Date of Patent: Aug. 31, 2021

(54) SYSTEM AND METHOD FOR CONTINUOUS USER IDENTIFICATION VIA PIEZO HAPTIC KEYBOARD AND TOUCHPAD DYNAMICS

(71) Applicant: Dell Products, LP, Round Rock, TX (US)

(72) Inventors: Michiel Knoppert, Amsterdam (NL); Priyank Gajiwala, Austin, TX (US); Frank van Valkenhoef, Hertogenbosch (NL)

(73) Assignee: Dell Products, LP, Round Rock, TX (US)

( * ) Notice: Subject to any disclaimer, the term of this patent is extended or adjusted under 35 U.S.C. 154(b) by 29 days.

(21) Appl. No.: 16/777,907

(22) Filed: Jan. 31, 2020

(65) Prior Publication Data

US 2021/0240805 A1 Aug. 5, 2021

(51) Int. Cl.
*G06F 21/31* (2013.01)
*G06F 3/02* (2006.01)
(Continued)

(52) U.S. Cl.
CPC .......... *G06F 21/316* (2013.01); *G06F 3/0202* (2013.01); *G06F 3/023* (2013.01); *G06F 3/03547* (2013.01); *G06N 20/00* (2019.01)

(58) Field of Classification Search
CPC ...... G06F 3/0416; G06F 3/0414; G06F 3/044; G06F 3/0412; G06F 3/016; G06F 3/041;
(Continued)

(56) References Cited

U.S. PATENT DOCUMENTS 4,618,797 A 10/1986 Cline
4,857,887 A 8/1989 Iten
(Continued)

FOREIGN PATENT DOCUMENTS

JP 2014164610 A 9/2014
KR 100442116 B1 7/2004
(Continued)

OTHER PUBLICATIONS

Rekimoto, J., et al., "PreSensell: Bi-directional Touch and Pressure Sensing Interactions with Tactile Feedback," Apr. 2006, 6 pages.
(Continued)

*Primary Examiner* — Nitin Patel
*Assistant Examiner* — Amen W. Bogale
(74) *Attorney, Agent, or Firm* — Prol Intellectual Property Law, PLLC; H. Kenneth Prol

(57) ABSTRACT

A piezo haptic keyboard and touchpad user identification system may comprise a processor receiving an authenticating user input identifying an authorized user of the information handling system, and a controller operably connected to a plurality of piezo electric elements situated beneath the keyboard. The controller may detect haptic hardware typing or touch behavior parameters describing characteristics of a plurality of deformations of the piezo electric elements during interaction between the authorized user and the keyboard, and the processor may use machine learning to identify a repeated pattern of values for a combination of the haptic hardware typing or touch behavior parameters reoccurring during interaction between the authorized user and keyboard. The processor may associate the repeated pattern of values for the combination of the haptic hardware typing or touch behavior parameters with the authorized user for later, passive authentication of a user based on typing dynamics.

20 Claims, 8 Drawing Sheets

(51) Int. Cl.
    *G06N 20/00*  (2019.01)
    *G06F 3/0354*  (2013.01)
    *G06F 3/023*  (2006.01)

(58) Field of Classification Search
    CPC . G06F 2203/04105; G06F 2203/04111; G06F 21/30; G06F 21/31; G06F 21/316; G06F 21/32; G06F 21/44; G06F 21/00; G06F 2203/0338; H01L 41/0825; H01L 41/113; H01L 41/1132; H01L 41/042; H01L 41/25; H02N 2/18; H02N 2/181; G02B 27/10; G02B 27/26; G02B 27/28; G02B 27/106; G02B 27/285; G02B 27/2235; G02B 6/0055; G03B 21/28; H04N 13/337; H04N 13/346; G06K 9/002; G06K 19/0718; G06K 19/07354; G06K 2209/00; G06K 9/0002; H04M 1/667; G06Q 20/40145; H04L 63/0861; H04L 9/3231; H03K 17/9643; H03K 17/96
    See application file for complete search history.

(56) References Cited

U.S. PATENT DOCUMENTS

| | | | |
|---|---|---|---|
| 5,463,388 A | 10/1995 | Boie | |
| 5,825,352 A | 10/1998 | Bisset | |
| 5,861,583 A | 1/1999 | Schediwy | |
| 5,887,995 A | 3/1999 | Holehan | |
| 6,147,680 A | 11/2000 | Tareev | |
| 6,188,391 B1 | 2/2001 | Seely | |
| 6,239,790 B1 | 5/2001 | Martinelli | |
| 6,532,824 B1 | 3/2003 | Ueno | |
| 6,574,095 B2 | 6/2003 | Suzuki | |
| 6,680,731 B2 | 1/2004 | Gerpheide | |
| 6,703,550 B2 | 3/2004 | Chu | |
| 6,822,635 B2 | 11/2004 | Shahoian | |
| 6,882,337 B2 | 4/2005 | Shetter | |
| 7,336,260 B2 | 2/2008 | Martin | |
| 7,439,962 B2 | 10/2008 | Reynolds | |
| 7,486,279 B2 | 2/2009 | Wong | |
| 7,523,410 B2 | 4/2009 | Rekimoto | |
| 7,535,454 B2 | 5/2009 | Jasso | |
| 7,741,979 B2 | 6/2010 | Schlosser | |
| 7,808,488 B2 | 10/2010 | Martin | |
| 8,144,453 B2 | 3/2012 | Brown | |
| 8,159,461 B2 | 4/2012 | Martin | |
| 8,164,573 B2 | 4/2012 | DaCosta | |
| 8,199,033 B2 | 6/2012 | Peterson | |
| 8,248,277 B2 | 8/2012 | Peterson | |
| 8,248,278 B2 | 8/2012 | Schlosser | |
| 8,279,052 B2 | 10/2012 | Heubel | |
| 8,294,600 B2 | 10/2012 | Peterson | |
| 8,294,677 B2 | 10/2012 | Wu | |
| 8,373,664 B2 | 2/2013 | Wright | |
| 8,477,113 B2 | 7/2013 | Wu | |
| 8,508,487 B2 | 8/2013 | Schwesig | |
| 8,542,134 B2 | 9/2013 | Peterson | |
| 8,581,710 B2 | 11/2013 | Heubel | |
| 8,633,916 B2 | 1/2014 | Bernstein | |
| 8,674,941 B2 | 3/2014 | Casparian | |
| 8,749,507 B2 | 6/2014 | DaCosta | |
| 8,773,356 B2 | 7/2014 | Martin | |
| 8,797,295 B2 | 8/2014 | Bernstein | |
| 8,842,091 B2 | 9/2014 | Simmons | |
| 9,178,509 B2 | 11/2015 | Bernstein | |
| 9,274,660 B2 | 3/2016 | Bernstein | |
| 9,280,248 B2 | 3/2016 | Bernstein | |
| 9,318,006 B2 | 4/2016 | Heubel | |
| 9,336,969 B2 | 5/2016 | Takashima | |
| 9,400,582 B2 | 7/2016 | Bernstein | |
| 9,477,342 B2 | 10/2016 | Daverman | |
| 9,535,557 B2 | 1/2017 | Bernstein | |
| 9,829,982 B2 | 11/2017 | Bernstein | |
| 10,089,840 B2 | 10/2018 | Moussette | |
| 10,120,450 B2 | 11/2018 | Bernstein | |
| 10,860,112 B1 | 12/2020 | Knoppert | |
| 2005/0100198 A1* | 5/2005 | Nakano | G06K 9/00335 |
| | | | 382/124 |
| 2006/0109255 A1 | 5/2006 | Chen | |
| 2007/0063987 A1 | 3/2007 | Sato | |
| 2007/0273671 A1 | 11/2007 | Zadesky | |
| 2008/0098456 A1 | 4/2008 | Alward | |
| 2008/0202824 A1 | 8/2008 | Philipp | |
| 2008/0259046 A1 | 10/2008 | Carsanaro | |
| 2009/0002178 A1 | 1/2009 | Guday | |
| 2009/0243817 A1 | 10/2009 | Son | |
| 2009/0315854 A1 | 12/2009 | Matsuo | |
| 2010/0089735 A1 | 4/2010 | Takeda | |
| 2010/0102830 A1 | 4/2010 | Curtis | |
| 2010/0110018 A1 | 5/2010 | Faubert | |
| 2010/0128002 A1 | 5/2010 | Stacy | |
| 2012/0062491 A1 | 3/2012 | Coni | |
| 2012/0092263 A1 | 4/2012 | Peterson | |
| 2013/0249802 A1 | 9/2013 | Yasutake | |
| 2014/0176332 A1* | 6/2014 | Alameh | G06F 21/32 |
| | | | 340/665 |
| 2015/0185842 A1 | 7/2015 | Picciotto | |
| 2017/0090749 A1* | 3/2017 | Marsden | G06F 3/04886 |
| 2017/0269688 A1 | 9/2017 | Chan | |
| 2018/0074694 A1 | 3/2018 | Lehmann | |
| 2019/0073036 A1 | 3/2019 | Bernstein | |
| 2019/0115522 A1* | 4/2019 | Wong | H03K 17/9643 |
| 2021/0112056 A1* | 4/2021 | Lee | G06F 21/36 |

FOREIGN PATENT DOCUMENTS

| | | |
|---|---|---|
| KR | 20040081697 A | 9/2004 |
| NO | 2004/042685 A2 | 5/2004 |
| NO | 2004/042693 A1 | 5/2004 |
| WO | 2005/057546 A1 | 6/2005 |
| WO | 2011/056752 A1 | 5/2011 |
| WO | 2011/071837 A2 | 6/2011 |

OTHER PUBLICATIONS

Rekimoto, J. et al., "PreSense: Interaction Techniques for Finger Sensing Input Devices," UIST '03 Vancouver, BC, Canada, Nov. 2003, pp. 203-212, ACM 1-58113-636-6/03/0010.

Holleis, P. et al., "Studying Applications for Touch-Enabled Mobile Phone Keypads," Proceedings of the Second International Conference on Tangible and Embedded Interaction (TEI'08), Feb. 18-20, 2008, Bonn, Germany, pp. 15-18.

Westerman, W. et al., "Multi-Touch: A New Tactile 2-D Gesture Interface for Human-Computer Interaction," Proceedings of the Human Factors and Ergonomics Society 45th Annual Meeting, Oct. 2001, pp. 632-636.

* cited by examiner

SYSTEM AND METHOD FOR CONTINUOUS USER IDENTIFICATION VIA PIEZO HAPTIC KEYBOARD AND TOUCHPAD DYNAMICS

FIELD OF THE DISCLOSURE

The present disclosure generally relates to a keyboard assembly of information handling systems. The present disclosure more specifically relates to identifying an individual user via a piezo electric haptic keyboard personal typing profile determined based on piezo haptic keyboard and touchpad dynamics.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling needs and requirements vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, the information handling system may include a keyboard for manual input of information by the user.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
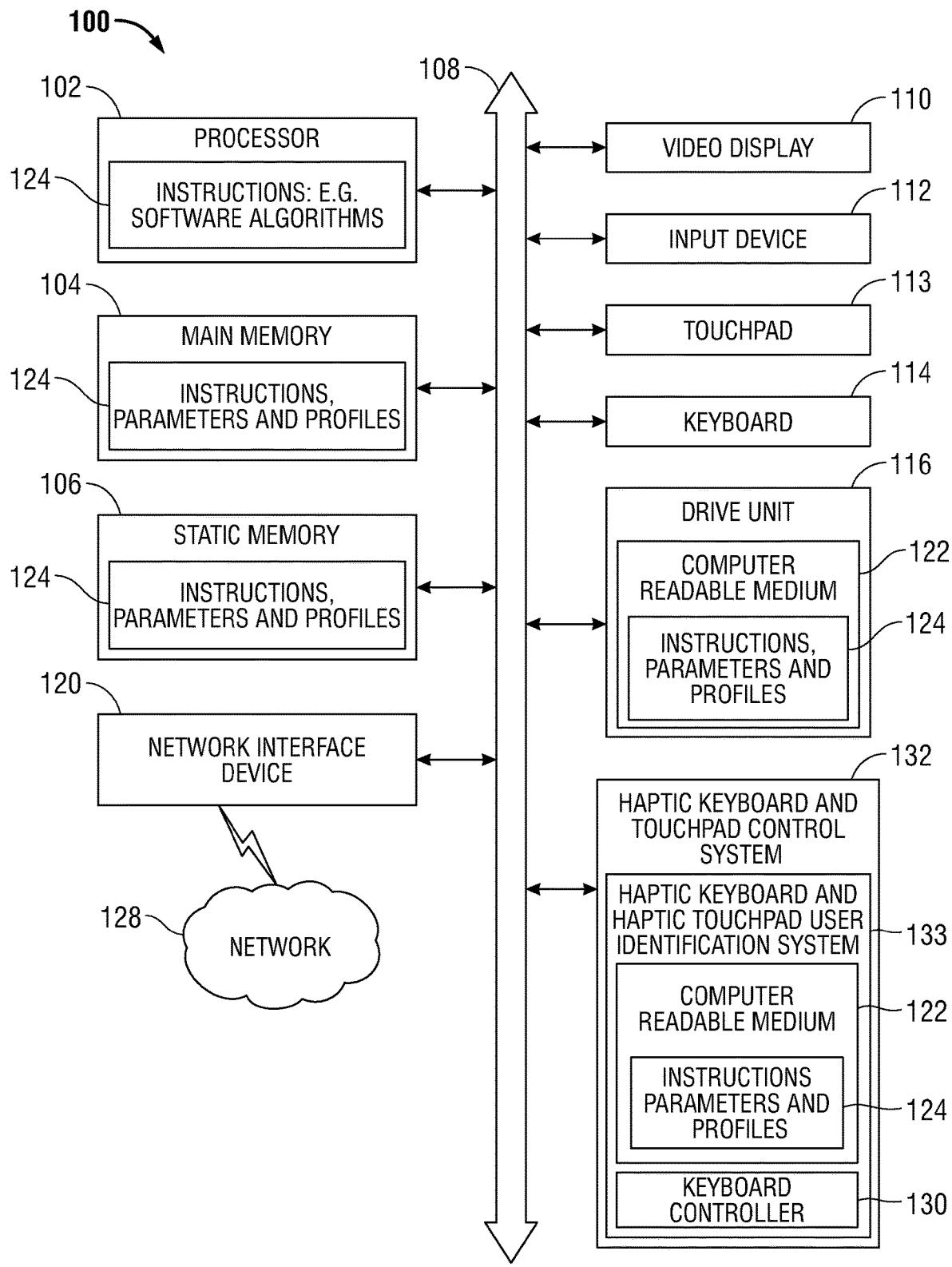
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Security of personal information, especially information created, accessed, or stored on information handling systems such as personal computers is a primary concern to users of such information handling systems. One-step security systems, such as password protections provide less secure environments than multi-step authentication systems, or continuously authenticating systems. Simultaneously, user demand drives the market for mobile information handling systems toward ever-slimmer, more lightweight laptop devices, prompting a need for ever-thinner keyboards. In order to decrease the thickness of laptop systems, keyboards employing piezo haptic technology that allows for monitoring of user typing behaviors may be used. A method leveraging this monitoring of user typing behavior to develop a passive, continuous user authentication is needed. Further, the piezoelectric function of the piezo haptic keyboard or haptic touchpad according to embodiments herein provide for a wider selection of haptic hardware typing or touch behavior parameters to be recorded and utilized as identifying factors not available in previous keyboard or touchpad systems. Haptic hardware typing or touch behavior parameters may include force dynamics of keystrokes, force heatmaps across keys of the haptic keyboard, typing patterns such as location of keystrikes, typing speeds, common mistakes, and pauses or the like, keystroke dynamics including speed of contact or duration of keystrokes among other factors.

A keyboard and touchpad user identification system in embodiments of the present disclosure address this issue by associating an authenticated user with an authenticated user typing profile describing that user's typing or touchpad operation behavior. The keyboard and touchpad user identification system locks access to the information handling system when the current typing or touchpad behavior does not match that of the authenticated user typing profile. For example, an authenticated user may log in to her personal computer, then step away momentarily. If, in such a scenario, another unauthorized user attempts to use that personal computer, the keyboard and touchpad user identification system may record the unauthorized user's haptic hardware typing or touch behavior, determine it does not match the known behavior of the authenticated user, and immediately lock access to the information handling system. In some embodiments, additional security factors may be included in the authenticated user typing profile including detected touch behavior as well as physical surrounding indicators or application usage data indicating applications operating. In such a way, the keyboard and touchpad user identification system may passively, and continuously secure personal information stored, created, or accessed on the information handling system.

A solid-state piezoelectric keyboard provides a thinner, more light-weight improvement over traditional scissor mechanism keyboards. The use of piezoelectric elements within the keyboard may eliminate the use of other devices such as a scissor mechanism that are used to maintain a keycap of a key above an electrical connection or for a dive board type mechanism under a touchpad. Instead, such piezoelectric elements may reduce or eliminate those mechanical elements that may fail after a number of actuations while also reducing the thickness of the keyboard or the touchpad itself. Instead of the keys of the keyboard requiring travel of a scissor mechanism within a C-cover of the information handling system, the relatively thinner keys defined (either physically or visibly) on the solid-state keyboard of the presently-described information handling system may reduce the physical thickness of the keyboard within the information handling system. Further, the solid-state touchpad may eliminate the dive board mechanism and underlying click switch for selection of items via the mechanically actuated touchpad. This may enable a thinner, more streamlined information handling system.

Embodiments of the present disclosure provide for a keyboard of an information handling system. The keyboard may include, in an embodiment, a coversheet to identify an actuation location of an input actuation device. In an embodiment a support layer may be placed underneath the coversheet to support the coversheet and other layers within the keyboard. The keyboard may, in an embodiment, include a contact foil placed between the coversheet and support layer. In the embodiments presented herein, the keyboard may include a piezoelectric element placed between the contact foil and support layer to receive an applied mechanical stress at the actuation location of the input actuation device. The keyboard of the information handling system, in an embodiment, may include a controller of the information handling system operatively coupled to the contact foil to receive an electric charge from the piezoelectric element placed under the mechanical stress. The controller may also send a haptic feedback control signal to the piezoelectric element of a signal varying in polarity, voltage or current to cause the piezoelectric element to provide haptic feedback at the actuation location.

During operation of the solid-state keyboard or touchpad of the information handling system described in embodiments herein, a key on the keyboard or the touchpad may be actuated by a user pressing down on a specific location. In an embodiment, this specific location may be visually indicated by an alphanumeric symbol such as those found on a QWERTY keyboard, a key pedestal or raised location, or another designation such as a tactile frame or depression in a cover sheet. The actuations of these specific locations by, for example, a user's finger causes a mechanical stress to be applied to the piezoelectric element resulting in the deformation of the piezoelectric element. Upon application of this mechanical stress and the deformation of the piezoelectric element, the piezoelectric element accumulates an electric charge that is passed to a controller of the information handling system via the contact foil described herein. In an embodiment, the controller receives the electrical charge as an actuation signal and correlates the charge received with a location on the keyboard or touchpad. In yet another embodiment, the received electrical charge magnitude of the actuation signal from a piezoelectric element may correlate to a magnitude of force applied by the user to press the key or touchpad.

The piezo haptic keyboard controller in embodiments described herein may use such a method to detect and record various metrics describing the dynamics of the piezo haptic keyboard assembly in use by a specific user over time. For example, such user haptic hardware typing or touch behavior parameters may describe the force of keystrokes, the location of keystrokes (e.g., in the center of a given key or in the corner of that key), duration of keystrokes, sharpness or speed of keystrokes, and overall typing speed applied by the user. The combination of specific values for each of these recorded user haptic hardware typing or touch behavior parameters may be specific to individual users, or may provide an accurate gauge for distinguishing between users. In other words, the specific combination of an individual user's force, location, and duration of keystrokes, keystroke sharpness, and overall typing speed may be sufficiently unique to an individual user so as to distinguish that user from most other users.

Turning now to the figures, FIG. 1 illustrates an information handling system 100 similar to information handling systems according to several aspects of the present disclosure. In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a control system, a camera, a scanner, a printer, a pager, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system may include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system 100 may include one or more storage devices, one or more communications ports for communicating with external devices, as well as, various input and output (I/O) devices 112, such as a keyboard 114, a touchpad, a mouse, a video/graphic display 110, or any combination thereof. The information handling system 100 may also include one or more buses operable to transmit communications between the various hardware components. Portions of an information handling system 100 may themselves be considered information handling systems 100.

Information handling system 100 may include devices or modules that embody one or more of the devices or execute instructions for the one or more systems and modules described herein, and operates to perform one or more of the methods described herein. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), control logic or some combination of the same. Any of the processing resources may operate to execute code that is either firmware or software code. Moreover, the information handling system 100 may include memory such as main memory 104, static memory 106, or other memory of computer readable medium 122 storing instructions 124 of the keyboard and touchpad user identification system 132, and drive unit 116 (volatile (e.g. random-access memory, etc.), nonvolatile memory (read-only memory, flash memory etc.) or any combination thereof. The information handling system 100 may also include one or more buses 108 operable to transmit communications between the various hardware components such as any combination of various input and output (I/O) devices.

The information handling system 100 may further include a video display 110. The video display 110 in an embodiment may function as a liquid crystal display (LCD), an organic light emitting diode (OLED), a flat panel display, or a solid-state display. Additionally, the information handling system 100 may include an input device 112, such as a cursor control device (e.g., mouse, touchpad, or gesture or touch screen input), and a keyboard 114. Various drivers and control electronics may be operatively coupled to operate input devices 112 such as the haptic keyboard 110 and haptic touchpad according to the embodiments described herein.

The network interface device shown as wireless adapter 120 may provide connectivity to a network 128, e.g., a wide area network (WAN), a local area network (LAN), wireless local area network (WLAN), a wireless personal area network (WPAN), a wireless wide area network (WWAN), or other network. Connectivity may be via wired or wireless connection. The wireless adapter 120 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. In some aspects of the present disclosure, one wireless adapter 120 may operate two or more wireless links.

Wireless adapter 120 may connect to any combination of macro-cellular wireless connections including 2G, 2.5G, 3G, 4G, 5G or the like from one or more service providers. Utilization of radiofrequency communication bands according to several example embodiments of the present disclosure may include bands used with the WLAN standards and WWAN carriers, which may operate in both licensed and unlicensed spectrums.

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations may include distributed processing, component/object distributed processing, and parallel processing. Alternatively, virtual computer system processing may be constructed to implement one or more of the methods or functionalities as described herein.

The present disclosure contemplates a computer-readable medium that includes instructions, parameters, and profiles 124 or receives and executes instructions, parameters, and profiles 124 responsive to a propagated signal, so that a device connected to a network 128 may communicate voice, video or data over the network 128. Further, the instructions 124 may be transmitted or received over the network 128 via the network interface device or wireless adapter 120.

The information handling system 100 may include a set of instructions 124 that may be executed to cause the computer system to perform any one or more of the methods or computer-based functions disclosed herein. For example, instructions 124 may execute a haptic keyboard and touchpad control system 132 which may include a haptic keyboard and touchpad user identification system 133, software agents, or other aspects or components. The haptic keyboard and touchpad user identification system 133 may be a separate system operating with the haptic keyboard and touchpad control system 132 executing instructions to operate the haptic keys and the haptic touchpad or it may be part of the same system. In some embodiments the haptic keyboard and touchpad control system 132 may be separate systems that operate the haptic keyboard 114 and the haptic touchpad or similar I/O device 112. The haptic keyboard and touchpad control system 132 herein may be considered to separately or jointly operate the haptic keyboard 114 or haptic touchpad in embodiments herein and reference to this system may only refer to control functions of either the haptic keyboard 114 or the haptic touchpad or may refer to control functions of both. Various software modules comprising application instructions 124 may be coordinated by an operating system (OS), and/or via an application programming interface (API). An example operating system may include Windows®, Android®, and other OS types. Example APIs may include Win 32, Core Java API, or Android APIs.

The disk drive unit 116 and the haptic keyboard and touchpad user identification system 133 may include a computer-readable medium 122 in which one or more sets of instructions 124 such as software may be embedded. Similarly, main memory 104 and static memory 106 may also contain a computer-readable medium for storage of one or more sets of instructions, parameters, or profiles 124 including haptic feedback modulation instructions of the haptic keyboard and touchpad control system 132 that allow for a user to input a desired level of haptic feedback at a key or location on a touchpad. The disk drive unit 116 and static memory 106 may also contain space for data storage. Further, the instructions 124 may embody one or more of the methods or logic as described herein for receiving actuation signals from piezoelectric elements of the haptic keyboard or haptic touchpad and returning haptic feedback control signals to those piezoelectric elements to generate a haptic feedback response event. For example, instructions relating to the haptic keyboard and touchpad control system 132 and the haptic keyboard and touchpad user identification system 133 software algorithms, processes, and/or methods may be stored here. In a particular embodiment, the instructions, parameters, and profiles 124 may reside completely, or at least partially, within the main memory 104, the static memory 106, and/or within the disk drive 116 during execution by a keyboard or touchpad controller, the processor 102 or some combination of both of information handling system 100. In some aspects, the keyboard controller or touchpad controller may also have a local memory to store some aspects of the haptic keyboard and touchpad control system 132 and the haptic keyboard and touchpad user identification system 133.

Main memory 104 may contain computer-readable medium, such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The haptic keyboard and touchpad user identification system 133 may be stored in static memory 106, or the drive unit 116 on a computer-readable medium 122 such as a flash memory or magnetic disk in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100 may also include the haptic keyboard and touchpad control system 132 and the haptic keyboard and touchpad user identification system 133 that may operate on a keyboard or touchpad controller and that may be operably connected to the bus 108. The haptic keyboard and touchpad control system 132 and the haptic keyboard and touchpad user identification system 133 computer readable medium 122 may also reserve or contain space for data storage at the controller or in the wider information handling system. The haptic keyboard and touchpad control system 132 may, according to the present description, perform tasks related to receiving actuation signals from one or more piezoelectric elements of a haptic keyboard 114 or a haptic touchpad, and return a determined haptic feedback control signal for a haptic feedback event to be generated at the actuation location as well as registering a character associated with an actuated key or a selection via a touchpad actuation. The haptic keyboard and touchpad user identification system 133 may, according to the present description, perform tasks related to identifying individual users based on measured behavioral parameters describing the way in which a user interacts with one or more piezo elements situated beneath the haptic keyboard 114 or a touchpad. In these embodiments, the haptic keyboard and touchpad control system 132 may receive an electric charge from any of a plurality of piezoelectric elements each associated with a key on keyboard 114 (i.e., a QWERTY keyboard), a key pad, or a location on a touchpad describing an actuation force and location applied by a user to perform a keystroke or a click of the touchpad and this information may be used by the haptic keyboard and touchpad user identification system 133.

In an embodiment of the present description, each of the keys of haptic keyboard 114 may be associated with a piezoelectric element. The piezoelectric element may be used to, as described herein, create an electrical charge relative to a key on the haptic keyboard 114 and send that electrical charge to a controller. In an embodiment, the controller executing some or all instructions of the haptic keyboard and touchpad control system 132 may receive the electrical actuation signal as an electric charge and send an electrical haptic feedback control signal to the piezoelectric element. Upon application of the electrical haptic feedback control signal at the piezoelectric element (i.e., having a specific current and voltage) associated with the actuated key of haptic keyboard 114 causes the piezoelectric element to convert that electrical haptic feedback control signal into a mechanical stress by, for example, stretching or compressing the piezo electric material to warp the piezoelectric element upward or downward. The mechanical stress of the piezoelectric material causing warping of the piezoelectric element due to the application of the electrical haptic feedback control signal may be felt by a user who actuated the key of haptic keyboard 114.

Similarly for a haptic touchpad 113, the touchpad interface area of a coversheet of the information handling system C-cover may be associated with an array of piezoelectric elements. The piezoelectric elements may be used to, as described herein, create an electrical charge relative to a touchpad interface area on the haptic touchpad 113 and send that electrical charge or electrical charges of an actuation signal to a controller. In an embodiment, the controller executing some or all instructions of the haptic keyboard and touchpad control system 132 may receive the electrical actuation signal as an electric charge and send an electrical haptic feedback control signal to the one or more piezoelectric elements. Upon application of the electrical haptic feedback control signal at the piezoelectric element or piezoelectric elements (i.e., having a specific current and voltage) associated with the actuation location of haptic touchpad 113 causes the piezoelectric element to convert that electrical haptic feedback control signal into a mechanical stress by, for example, stretching or compressing the piezo electric material to warp the piezoelectric element upward or downward. The mechanical stress of the piezoelectric material causing warping of the piezoelectric element due to the application of the electrical haptic feedback control signal may be felt by a user who actuated the actuation location of haptic touchpad 113.

In an embodiment, the keyboard controller 130 may execute instructions, parameter, and profiles 124 to implement the functions of the keyboard 114 as described herein. The haptic keyboard and touchpad control system 132 in an embodiment may include one or more sets of instructions that, when executed by the keyboard controller 130, determines which of any plurality of keys of keyboard 114 were activated. In an example, the keyboard controller 130 may receive, from a piezoelectric element, an electric charge and produce a haptic feedback control signal to the piezoelectric element. The haptic keyboard and touchpad user identification system 133 may execute instructions parameters, and profiles 124 to utilize detection of typing behaviors via haptic hardware metric detection to identify that a user matches a authenticated user personal typing profile as a security measure. The haptic keyboard and touchpad user identification system 133 may also utilize other sensors including user-defined settings, physical surrounding indicators, and application usage data for security verification according to embodiments herein.

In an embodiment, the haptic keyboard and touchpad control system 132 and the haptic keyboard and touchpad user identification system 133 of haptic keyboard controller or a haptic touchpad controller may communicate with the main memory 104, the processor 102, the video display 110, the alpha-numeric input device 112, and the network interface device 120 via bus 108, and several forms of communication may be used, including ACPI, SMBus, a 24 MHZ BFSK-coded transmission channel, or shared memory. Keyboard driver software, firmware, controllers and the like may communicate with applications on the information handling system 100.

In other embodiments, dedicated hardware implementations such as application specific integrated circuits, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module may include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module may also include a combination of the foregoing examples of hardware or software. In an embodiment an information handling system 100 may include an integrated circuit or a board-level product having portions thereof that may also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another may communicate directly or indirectly through one or more intermediaries.

Figure 2:
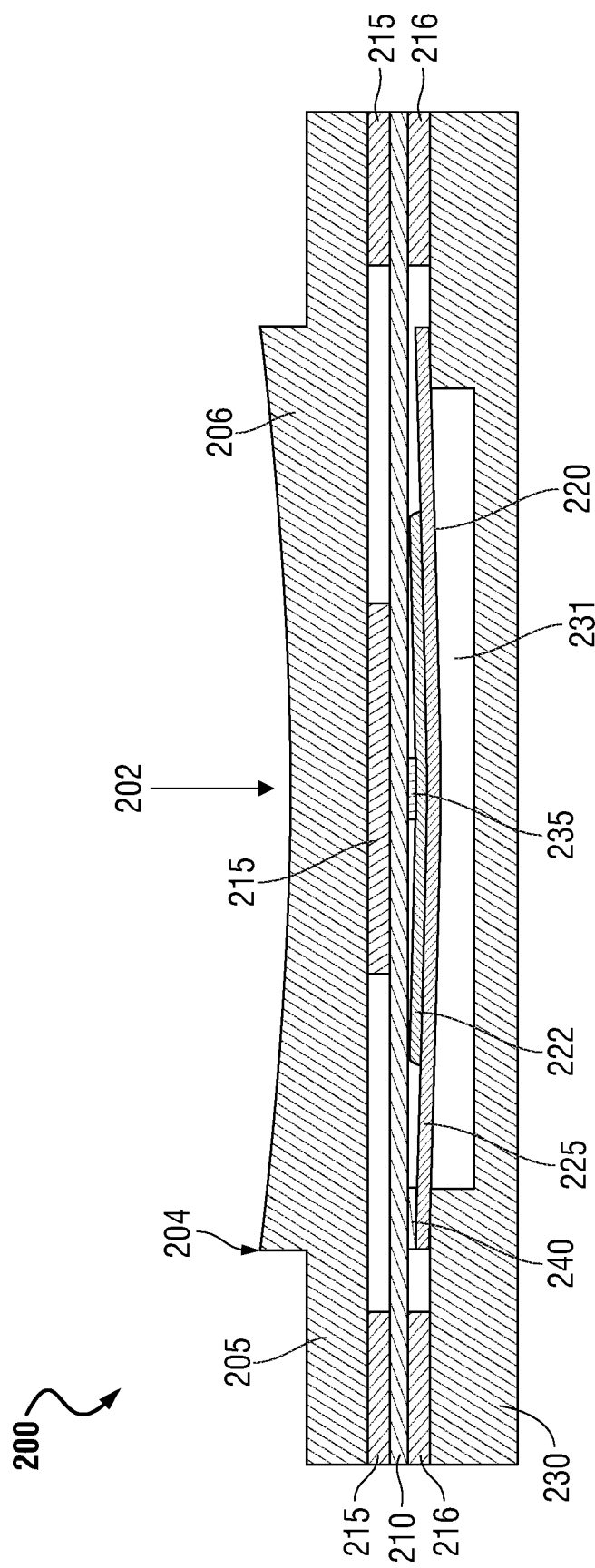
FIG. 2 is cross-sectional graphical view of a piezo haptic keyboard layer stack according to an embodiment of the present disclosure.

FIG. 2 is a side cut-out view of a key 200 of a keyboard implementing a piezoelectric element deforming under pressure applied by a user according to an embodiment of the present disclosure. As described herein, user demand drives the market for mobile information handling systems toward ever-slimmer, more lightweight laptop devices, prompting a need for every-thinner keyboards. In order to decrease the thickness of laptop systems, keyboards may employ piezo haptic technology that is slimmer than tradition mechanical keyboard systems. In an example embodiment, the keyboard with piezo haptic technology may mimic the tactile sensation of traditional mechanical keyboards, but may replace a key cap, scissor mechanism, and rubber dome of a traditional mechanical key assembly with a keyboard cover sheet lying atop a deformable piezo element layer.

According to an embodiment, the key 200 may be formed of a plurality of layers, one layer of which is a piezoelectric element 220. Although FIG. 2 shows a cross-sectional view of a single key 200, the present specification contemplates that a keyboard may also include a plurality of these similar keys 200 arranged as, for example, a QWERTY-type keyboard. The present specification also contemplates that, in addition to a keyboard, an information handling system described herein may also include a touchpad including a piezoelectric element 220 as described herein. Consequently, FIG. 2 is not intended to be limiting but merely intended as a description of operation of any type of input device contemplated by the present disclosure.

The key 200 includes a coversheet 205. The coversheet 205 may be made of any type of elastically resilient material.

The elastically resilient material may allow, at least, a portion of the key 200 to be deformed upon application of a pressure from a user's finger. Upon withdrawal of the pressure from the user's finger, the material the coversheet 205 is made of allows the coversheet 205 of the key 200 to bend back to its pre-deformed state. In an embodiment, the resilient material may allow the coversheet 205 to travel a minimal distance and still deform a piezoelectric element 220. For example, a distance of between 0.01 mm and 2 mm. In an embodiment, the distance is between 0.05 mm and 0.15 mm. In an embodiment, the distance is 0.1 mm.

In an embodiment, the shape of the coversheet 205 may have a selection of key pedestals 206 of various sizes and shaped so as to conform to a user's finger. In an embodiment, in order to shape the coversheet 205, the material used to form the coversheet 205 may be subjected to an injection molding process. As such, a top portion of the coversheet 205 may be formed to be ergonomically beneficial to a user's actuation such as by conforming to the user's fingers and including a pedestal 206 to highlight the key location, for example. In other embodiments, no key pedestals may be formed and a key location may be described in coversheet 205 via markings, depressions, key framing, or other methods. The injection molding process may be completed prior to the installation of the coversheet 205 into the remaining layers within the keyboard 200 as described herein. Any number of processes may be included with the injection molding process. In an embodiment, the injection molding process used to form the coversheet 205 may include forming a number of holes within a sheet of acrylonitrile butadiene styrene (ABS). These holes may correlate with a number of keys on a keyboard. The formation of the coversheet 205 may continue with injection molding a translucent ABS through the holes to form a raised portion correlating with each of the number of keys on the keyboard. Opposite the raised portions a number of runners may be machined away to accommodate for receipt of other layers of the keyboard such as each of the piezoelectric elements. The surface of the coversheet on which the raised portions are formed may be painted and any number or type of graphics may be laser etched on each raised portion indicating a specific key of the keyboard.

In other embodiments, the coversheet of the C-cover may include a plurality of vias for keys 200 having a cover sheet 205 or cap for each key. A key pedestal 206 for each key 200 in a solid-state keyboard of the present embodiments may be disposed through the vias in the C-cover in such embodiments. Each haptic key of the haptic keyboard in such an embodiment may include a cover layer similar to those described directly above that protrudes through the key vias in the coversheet 205. Layering under the coversheet may include material layers that are hydrophobic or have other properties. Though gaps between haptic keys and key vias may be minimized, such gaps may be useful for cooling ventilation of the base chassis or for allowing backlighting to frame the haptic keys. Similarly, a touchpad top touch interface layer may be attached under the coversheet 205 to seamlessly provide a designated touchpad area in the C-cover coversheet for access to the top cover sheet 205 of the solid state touchpad in some embodiments. Any combination of a continuous coversheet for haptic keys and vias in the coversheet for placement of haptic keys of a keyboard coversheet layer are contemplated in various embodiments. Further, it is contemplated that in some embodiments one or the other of a haptic keyboard or haptic touchpad may be used with a keyboard having mechanically actuated keys or a touchpad with a mechanically actuated diving board mechanism.

The key 200 may further include a number of adhesive layers 215 that physically couple the various layers of the key 200 together. In an embodiment, a first adhesive layer 215 may be formed on the coversheet 205 to adhere the coversheet 205 to the contact foil 210. The first adhesive layer 215 may include the placement of the adhesive at locations that may enhance the movement and prevent the hindrance of the actuation of the coversheet 205. In a specific embodiment, the first adhesive layer 215 may include placing the adhesive along borders of the key 200 as well as placing the adhesive at a central location of the key 200.

The contact foil 210 may be made of any elastically resilient material that, when the coversheet 205 of key 200 is actuated or the contact foil 210 is bent towards a lower portion of the key 200, returns to its original state when the key 200 is no longer being actuated. The contact foil in an embodiment may be a flexible material, such as polyethylene terephthalate (PET) serving as a polyester printed circuit board or other type of flexible printed circuit board, in several example embodiments. The contact foil 210 may include a number of metal traces formed on one or more of its surfaces that electrically and communicatively couple each of the corresponding piezoelectric element 220 of key 200 to a keyboard controller such as a processor of an information handling system that includes a haptic keyboard and touchpad control system 132 such as described herein. Formation of metal traces may be made according to a variety of methods including photolithographic techniques for applying metal or lamination of copper strips or other metal layers.

In an embodiment, portions of the contact foil 210 may be physically coupled to a support plate 230 via a second layer of adhesive 216. The location of the placement of the second adhesive layer 216 may include placing the adhesive along borders of the key 200.

In an embodiment presented herein, the piezoelectric element 220 may include a first portion 222 that may be any solid piezoelectric material that accumulates an electric charge when a mechanical stress is applied to it or specifically, in the embodiments presented herein, when the solid material is deformed. Solid materials used to form the piezoelectric element 220 may include crystals, ceramics, or protein layers, among other types of materials. For ease of explanation, the piezoelectric element 220 may be made of a type of ceramic although the present specification contemplates the use of other types of piezoelectric materials.

The piezoelectric element 220 may be housed over a cavity 231 formed in the support plate 230. The piezoelectric element 220 may comprise two portions 222 and 225 each electrically coupled via electric contact points such as soldering points 235 and 240, respectively, to a different electrical trace on the bottom surface of the contact foil 210. The first portion 222 may be a ceramic disc in an embodiment. Second portion 225 of the piezoelectric element 220 may be a metal plate or ring, such as a brass plate, that extends beyond the edges of cavity 231. The first portion 222 and the second portion 225 may be operatively coupled via adhesive including conductive adhesives. The soldering points 235 and 240 may be silver solder contact points for operative electrical coupling to metal traces on the bottom surface of contact foil 210. As so oriented, the first soldering point 235 and second soldering point 240 may be formed to receive an electrical charge upon deflection of the piezoelectric element 220 as a user actuates the key 200. The brass plate 225 supports deflection of the piezoelectric element 220 into the cavity 231 to detect mechanical actuation of the key 200. In an embodiment, the support plate 230 may have a cavity 230 formed therein such that the piezoelectric element 220 may be allowed to be deflected therein when the key 200 is actuated by a user and cavity 231 may be an aperture or hole through support plate 230 or may be a depression or hole in support plate 230 that does not pass through 230.

In an embodiment presented herein, the piezoelectric element 220 may be any solid material that accumulates an electric charge when a mechanical stress is applied to it or specifically, in the embodiments presented herein, the solid material is deformed. Solid materials used to form the piezoelectric disk 222 or other piezoelectric material as part of a first portion 222 of the piezoelectric element 220 may include crystals, ceramics, biological matter, protein layers, among other types of materials. For ease of explanation, the piezoelectric disk material 222 may be made of a type of ceramic although the present specification contemplates the use of these other types of materials.

During operation of the key 200, the contact foil 210 may receive an electrical charge from the piezoelectric element 220 at the metal traces on the bottom surface of the contact foil 210 that conduct the electrical charge to the processor or other keyboard controller associated with the key 200. For example, as the piezoelectric disk material 222 is compressed by deflection and the metal plate or ring 225 warped downward toward the cavity 231 within support plate 230, a change in voltage may be detected. The electrical charge created when the user actuates the key 200 and the piezoelectric element 220 is subjected to a mechanical stress may be detected between soldering points 235 and 240. The electrical charge may be communicated down metal traces formed on the contact foil 210 to a controller (not shown).

The metal traces formed on the contact foil 210 may further be used to conduct a return electrical haptic feedback control signal from the controller to the piezoelectric element 220 so that the voltage and current of the return electrical haptic feedback control signal may cause the piezoelectric element 220 to return to a planer and rigid piezoelectric element 220 as required to cause a specified haptic response to the user via coversheet 205. For example, this electrical haptic feedback control signal may have a certain voltage, current, and polarity (−, +) sufficient to render the piezoelectric material of the piezoelectric element 220 to cause a haptic event or sound. Such a response signal may be a sine wave, a square wave, a pulsed signal, or other waveform of changing current, voltage, or polarity applied to the piezoelectric element 220. This stiffening of the piezoelectric element 220 may cause a haptic feedback presented at the key 200 via the contact foil 210, adhesive 215, and coversheet 205 that the user may feel. Upon receiving an actuation signal, the controller sends an electrical haptic feedback control signal back to the piezoelectric element 220 via the metal traces formed on the contact foil 210, through the soldering points 235 and 240 and to a conductive layer of metallic plate or ring 225 formed below the piezoelectric disk material 222.

Upon receiving an actuation signal, the controller sends an electrical haptic feedback control signal back to the piezoelectric element 220 via the metal traces formed on the contact foil 210, through the soldering points 235 and 240 and to a conductive layer of metallic plate or ring 225 formed below the piezoelectric disk material 222. The conductive layer of metallic plate or ring 225 may apply the electrical haptic feedback control signal to the piezoelectric disk material 222 so as to cause the piezoelectric disk material 222 to stretch or shrink depending on the polarity of the signal applied. For example, a negative signal applied to piezoelectric disk material element 222 relative to the charge at adhesively attached metallic plate 225 may cause piezoelectric disk 222 to expand or stretch in embodiments herein. This may cause metallic plate 225 to warp downward. Reversing polarity to the piezoelectric disk 222 may cause the piezoelectric disk 222 to compress or shrink and metallic plate 225 may warp upwards. The principle of haptics applied to the piezoelectric disk 222 includes an input voltage that is applied through the two electrodes (voltage change as sine wave, square wave etc.) to generate movement on piezoelectric material 222 of the piezoelectric element 220 and a warping of the metallic layer or disk 225.

This haptic response signal is used to cause a haptic tactile feedback such as a depression and return of the key 200 or a haptic "click" of a touchpad and which may be accompanied by a sound. Such an electrical haptic feedback control signal, such as a sine wave signal, or other haptic response signals with varying polarities or voltage and current may be used by the keyboard controller to create the haptic feedback felt by the user as described herein. In these embodiments, the electric charge sent from the piezoelectric element 220 to the keyboard controller and the electrical haptic feedback control signal sent from the controller to the piezoelectric element 220 may propagate along the two metal traces formed on the bottom surface of the contact foil 210. The contact foil 210 may therefore, in an embodiment, include double the number of metal traces on its bottom surface as that of the number of piezoelectric elements 220 used to form a keyboard that includes multiple keys 200. This haptic feedback may be relayed to the user within microseconds of the user actuating the key 200 such that the user physically detects a sensation that the key 200 was pressed. This sensation felt by the user may be present despite no actual mechanical devices such as a scissor mechanism or other types of keyboard mechanical devices being present among the layers of the key 200. The signal to the piezoelectric element 220 may vary magnitude and pulsing to create the desired haptic response at key 200.

In some embodiments, the controller may apply a series of voltage pulses to the piezo electric element 220, via the contact foil 210, causing the piezo element 220 to vibrate, pulse, or move between its upward warped, downward warped, or neutral positions over a preset time period.

In addition, by applying voltage of varying magnitude or polarity to the piezo element 220, the controller may determine the sensitivity of the piezo element 220 to detect actuation of a key 200 or to modify the sensitivity to corner strikes 204 in preference to downward pressure 202 that is centered over key 200. In an embodiment, the haptic keyboard and touchpad control system 132 may be used to set the force threshold at which a keyboard controller registers a keystroke to be greater or less pressure. Requiring greater pressure will decrease sensitivity of the key 200 to keystrikes and to corner strikes 204. This may be useful when corner strikes 204 are errant strikes causing mistyped characters. Requiring less pressure will increase sensitivity of key 200 to keystrikes as well as to corner strikes 204 which may enable faster typing for an accurate typist or may provide a feel desired by some users with respect to typing on the haptic keyboard. In such a way, the keyboard controller operating the haptic keyboard and touchpad control system may set the downward force required to register a keystroke, as well as roughly define the area (e.g., in the center of the key, or on the edges of the key) in which a user must apply that force. In this way, pressure level required to actuate the piezo-electric keyboard may be set.

As another example, the controller may set the intensity or force with which a key provides a haptic response following a keystroke by causing the piezo element 220 to rotate between its upward warping, downward warping, and neutral position. In other words, the controller may set the cycle of movement, pulsing, and intensity of the piezo element 220 movement by adjusting the amplitude, polarity, pulsing, or waveform of the haptic control signal provided to a piezo electric element 220. The controller in another example may set the duration of such a haptic response by adjusting the period of haptic response, or the duration of time between detection of the keystroke and deflection of the piezo element 220. Movement or vibration sharpness in an embodiment may refer to the amount of time that is allowed to pass between detection of a keystroke and initiation of a haptic response. For example, a controller in an embodiment may receive a voltage generated at the solder points 235 and 240 via the contact foil 210 when the piezo element 220 warps downward under user-applied force, and may respond by transmitting a haptic voltage signal causing the piezo element 220 to warp upward, or to move between upward and downward warped positions. The controller in such an embodiment may affect the sharpness of a vibration by allowing a shorter or longer time period to elapse between receipt of the voltage indicating the piezo element 220 has been deformed downward under user-applied pressure and transmission of the responsive haptic voltage signal causing the haptic movement (e.g. upward or downward warping) of the piezo element 220. The haptic response may be a vibration, a click, a depression followed by an upward motion, or a more nuanced movement invoked by the piezo-electric element 220.

The controller in some embodiments may also cause a piezo element 220 to vibrate or otherwise move in response to a haptic response control signal for a prolonged period, in a burst under certain conditions. For example, certain keys may be used as hot keys or controller keys for certain applications in an embodiments. A user playing a video game may use the "F" key to fire a weapon, for example. In some embodiments, the controller may set these hot buttons or controller keys to deliver such a burst or prolonged vibration in response to certain instructions received from the corresponding application (e.g., computer game). For example, the "F" key used to fire a weapon in an embodiment may deliver a burst of vibration or another movement when the weapon the user is attempting to fire is out of ammunition. In another example embodiment, the piezo element 220 situated beneath the touchpad may deliver a burst vibration to indicate the player has been injured. The controller in such embodiments may control the duration of such bursts, and the interval between the bursts by setting the number of voltage pulses, and the timing between them that the contact foil 210 applies to the piezo element 220.

The controller applying voltages to the contact foil 210 in an embodiment may control the several factors describing the dynamics of each piezo element 220, individually, in such a way. In other words, the controller in an embodiment may apply different piezo haptic settings to different piezo elements, operating simultaneously. For example, piezo elements situated beneath two separate keys may operate according to separate dynamics, based on voltages applied by the controller, separately, to each of those piezo elements. As another example, piezo elements situated beneath the touch pad may operate according to separate dynamics than piezo elements situated beneath keys on the cover sheet 205. In still another example, piezo elements situated in one region of the touch pad may operate according to separate dynamics than piezo elements situated beneath another region of the touch pad.

FIG. 2 shows an image of a single key 200. The present specification contemplates that a plurality of keys 200 may be formed alongside each other in order to form, for example, a number pad, a keyboard, or a combination thereof. Consequently, although the features of the key 200 depicted in FIG. 2 apply to a single key 200, the present specification contemplates that any number of keys 200 may be formed on the keyboard so as to allow for the formation of an input device such as a keyboard. The keys 200 may be of any size (e.g., spacebar, tab key, or the like) and depending on size may include more than one piezoelectric element 220 associated with it. As the user actuates each of the keys 200, a haptic feedback may be felt by the user so as to present to the user a sensation that the key was pressed. This operation of key 200 may be conducted every time the user actuates the key 200.

The formation of the key 200 may, in the embodiments presented herein, provide for a keyboard that has a relatively shorter distance of key travel as compared to those keyboards that implement mechanical devices such as a scissor mechanisms and key caps. In an embodiment, the distance of travel of the key 200 may be smaller than 0.1 mm. With the shorter distance of key travel, the overall thickness of the keyboard placed within an information handling system may be reduced. This increases the available footprint within a base chassis of, for example, a notebook-type information handling system that may be used for more or larger components (e.g., batteries) to be placed within the base chassis. Additionally, or alternatively, the reduction in thickness of the keyboard may reduce the overall thickness of the information handling system improving the aesthetics of the design of the information handling system. This reduction in size of the information handling system may also result in the reduction of the weight of the information handling system thereby increasing the portability of the information handling system by the user.

The keys 200 of the present embodiments also include no moving mechanical parts. With the absence of mechanical moving parts, the key 200 of the presently described embodiments may be relatively more robust thereby increasing the useful life of the key 200. This may increase user satisfaction over the useful lifetime of the information handling system.

Figure 3:
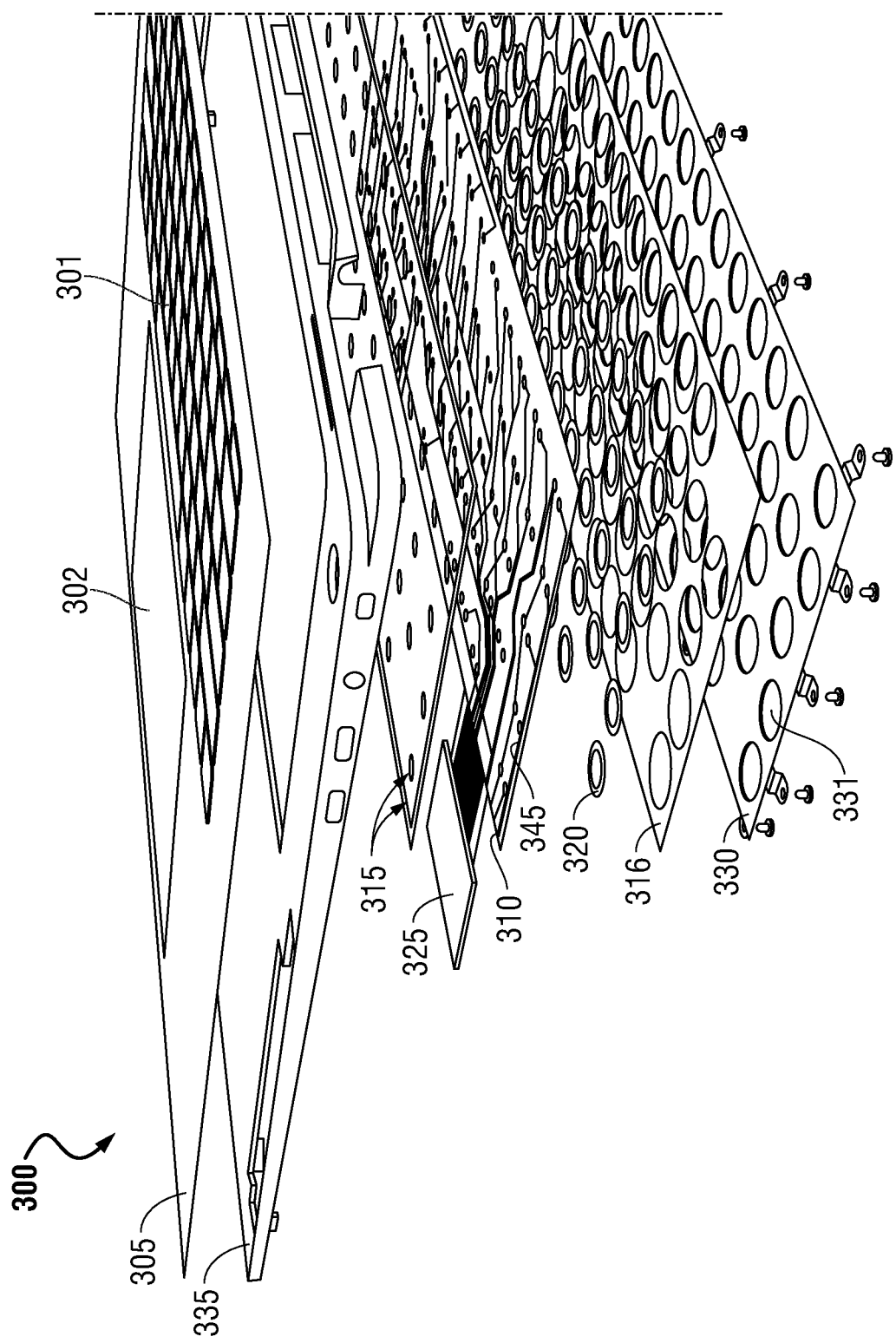
FIG. 3 is an exploded perspective graphical view of a piezo haptic keyboard layer stack according to an embodiment of the present disclosure.

FIG. 3 is an exploded perspective graphical view of a piezo haptic keyboard layer stack including a controller setting and recording various dynamics of a plurality of piezo electric elements according to an embodiment of the present disclosure. The keyboard stack up 300 shows a plurality of keys, similar to those described in connection with FIG. 2, arranged so as to receive input from a user at multiple keys. FIG. 3 also shows a top coversheet 305 having both a keyboard 301 and a touchpad 302. Either or both of the keyboard 301 and touchpad 302 may be haptic systems as described in embodiments herein. In an embodiment, the keys may be arranged similar to a QWERTY design of a keyboard 301. However, other arrangements of any alphabetic, numeric, or symbolic keys is contemplated by the present description.

The keyboard stack up 300 may include several layers similar to those described in connection with FIG. 2. In an embodiment, the keyboard stack up 300 includes a coversheet layer 305. The coversheet layer 305 may be made of any type of elastically resilient material. Coversheet layer 305 may include a plurality of key designations, such as key pedestals as shown in keyboard 301 and a touchpad 302 area designation. The elastically resilient material may allow, at least, a portion of the coversheet layer 305 to be deformed upon application of a pressure from a user's finger. Upon withdrawal of the pressure from the user's finger, the material the coversheet layer 305 is made of allows the coversheet layer 305 of the key to bend back to its pre-deformed form. In an embodiment, the resilient material may allow the coversheet layer 305 to travel a distance of between 0.01 mm and 2 mm.

In an embodiment, the shape of the coversheet layer 305 may be such so as to conform to the user's fingers. In an embodiment, in order to shape the coversheet 305, the material used to form the coversheet 305 may be subjected to an injection molding process. As such, a top portion of the coversheet layer 305 may be formed to be ergonomically beneficial to a user's actuation such as by providing a tactile key location designation and conforming to the user's fingers, for example. The injection molding process may be completed prior to the installation of the coversheet 305 into the remaining layers within the keyboard 300 as described herein. Any number of processes may be included with the injection molding process, including forming a number of holes correlated with a number of keys 301 on the keyboard 300 within sheet of ABS, and injection molding a translucent ABS through the holes to form a raised portion correlating with each of the number of keys 301 on the keyboard 300. Opposite the raised portions a number of runners may be machined away to accommodate for receipt of other layers of the keyboard such as each of the piezoelectric elements 320.

In other embodiments, the coversheet of the C-cover 335 may include a plurality of vias for keys 301 having a cover sheet 305 or cap for each key 301. A key pedestal for each key 301 in a solid-state keyboard of the present embodiments may be disposed through the vias in the C-cover 335 in some example embodiments. Similarly, it is contemplated that coversheet layer 305 may include a touchpad via as a window for a touchpad interface surface of a solid state touchpad according to embodiments. Each haptic key of the haptic keyboard in such an embodiment may include a cover layer similar to those described directly above that protrudes through the key vias in the coversheet 305. Layering under the coversheet may include material layers that are hydrophobic or have other properties. Though gaps between haptic keys and key vias may be minimized, such gaps may be useful for cooling ventilation of the base chassis or for allowing backlighting to frame the haptic keys. Similarly, a touchpad 302 top touch interface layer may be attached under the coversheet 305 to seamlessly provide a designated touchpad area in the C-cover 335 coversheet 305. Any combination of a continuous coversheet for haptic keys and vias in the coversheet for placement of haptic keys of a keyboard coversheet layer 305 are contemplated in various embodiments. Further, it is contemplated that in some embodiments one or the other of a haptic keyboard or haptic touchpad may be used with a keyboard 300 having mechanically actuated keys 301 or a touchpad 302 with a mechanically actuated diving board mechanism. Any combination of the above coversheet 305 layouts described is contemplated in embodiments described herein.

The keyboard stack up 300 may further include a C-cover substructure 335 forming part of the base chassis with a cutout for keyboard 301 and touchpad 302. The C-cover substructure 335 may be made of a rigid material that prevents little or no movement. The rigidity of the C-cover substructure 335 allows the other layers within the keyboard 301 to be maintained within the information handling system. In an embodiment, the C-cover substructure 335 may be made of a metal.

The keyboard stack up 300, in an embodiment, may further include any number of adhesive layers 315. In an embodiment, a first adhesive layer 315 may mechanically couple the coversheet layer 305 to a contact foil layer 310. The first adhesive layer 315 may include the placement of the adhesive at locations that may enhance the movement and prevent the hindrance of the actuation of the coversheet layer 305 at those locations across the coversheet layer 305 where keys are present. In a specific embodiment, the first adhesive layer 315 may include placing the adhesive along borders of each of the keys as well as placing the adhesive at a central location of each of the keys.

The contact foil layer 310 is adhered to the coversheet layer 305 via the first adhesive layer 315 may be made of any elastically resilient material that, when any given key is actuated or the contact foil layer 310 is bent towards a lower portion of the respective key, returns to its original state when the respective key is no longer being actuated. The contact foil layer 310 may include a number of metal traces 345 formed on one or more of its surfaces that electrically and communicatively couples each of the keys and a corresponding piezoelectric element 320 to a keyboard controller 326 of an information handling system that includes a haptic keyboard and touchpad control system 132 such as described in connection with FIG. 1. In an embodiment, the keyboard controller 326 may be a dedicated controller communicatively coupled to the contact foil layer 310 so as to detect electrical charges from each of the piezoelectric elements 320 and provide electrical haptic feedback control signals back to the respective piezoelectric elements 320. In an alternative embodiment, the keyboard controller 326 may be a processor of the information handling system that, among other computations and execution of other computer readable program code, also executes computer readable program code associated with the typing profile personalization system as described in FIG. 1.

During operation of each key on the keyboard 301, the contact foil layer 310 may receive an electrical charge from the respective piezoelectric elements 320 as they are compressed upon actuation at the metal traces 345 that conduct the electrical charge to the controller 325 associated with the keyboard 300. The metal traces 345 formed on the contact foil layer 310 may further be used to conduct a return electrical haptic feedback control signal from the controller 325 to the piezoelectric elements 320 so that the voltage and current of the return electrical haptic feedback control signal may cause the piezoelectric elements 320 to stretch or contract in response to a control haptic feedback signal and at varying polarities, voltages, or currents. This electrical response control signal to of each of the actuated piezoelectric elements 320 may cause a haptic feedback presented at each of the keys that the user may feel. This haptic feedback may be relayed to the user within microseconds of the user actuating any of the keys on the keyboard 301 such that the user physically detects a sensation that the key was pressed. This sensation felt by the user may be present despite no actual mechanical devices such as a scissor mechanism or other types of keyboard mechanical devices being present among the layers of the keyboard 301.

The keyboard stack up 300 may further include a second adhesive layer 316 that mechanically couples the contact foil layer 310 to a support plate 330. In an embodiment, the second adhesive layer 316 may include the placement of an adhesive along borders of each piezoelectric element 320 of the keyboard stack up 300. As shown in FIG. 3, the second adhesive layer 316 includes circular voids that conform to a shape of each piezoelectric element 320 within the keyboard stack up 300.

The support plate 330 may be made of rigid material such as a metal. The support plate 330 prevents deformation of the keyboard stack up 300 except for, in some embodiments, the contact foil layer 310, piezoelectric element 320, first adhesive layer 315, and second adhesive layer 316 as for operation of the haptic keys. As such, the contact foil layer 310 may be allowed to detect the deformation of the piezoelectric elements 320. Additionally, a user using the keyboard 301 may feel a level of rigidity in the keyboard 301 except that at the locations of the keys where the user has expected that some level of deformation occurs when pressure is applied to provide for key actuation of the piezoelectric element 320.

In an embodiment, the support plate 330 may include a number of cavities 331 formed therein. The cavities 331 may be sized to have a relatively smaller diameter than the diameter of each of the respective piezoelectric elements 320. By including these cavities 331, the piezoelectric elements 320 may be allowed to be deformed into the cavities 331 so that the deformation of the piezoelectric element 320 creates the electrical charge described herein. The metal plate of the piezoelectric elements 320 may have a diameter greater than cavities 331. Upon compression or contraction of the piezoelectric material portions, such as a ceramic disk of the piezoelectric element 320, the metal plate may warp into or away from the cavity 331. The depth of the cavities 331 may also be selected to allow for at least a central portion of each piezoelectric element 320 to be deflected into the cavities 331 some distance. This distance of deflection, in an embodiment, may be 0.1 mm or smaller or may be greater. In an embodiment, the cavities 331 may also be holes punched or machined through the support plate 330.

In an embodiment, the support plate 330 may be secured to other rigid elements of the information handling system. In an embodiment, the support plate 330 may be secured to the C-cover substrate 335 via a number of bolts, screws, or other mechanical or chemical coupling device. In some embodiments, the support plate 330 may be operatively coupled to the D-cover of the information handling system.

Each of the piezoelectric elements 320 may include a first portion layer of piezoelectric material and a second portion conductive layer as described herein in connection with the larger figures describing the keys in FIG. 2. Additionally, each piezoelectric element 320 of the keyboard 301 may be operatively coupled to at least one metal trace 345 formed on the contact foil layer 310 via a contact point such as a solder point. The contact foil layer 310 may, in a particular embodiment, include two metal traces 345 for each piezoelectric element 320 at a first portion and a second portion formed in the keyboard 301.

During operation of the keyboard 301, a user may actuate a key formed on the coversheet layer 305 of the keyboard 301 by pressing down on that key. As a result of the mechanical stress placed on the piezoelectric material of the piezoelectric element 320 associated with the actuated key, an electric charge is created at the piezoelectric element 320. The electrical charge is carried to one or more metal traces 345 coupled to the piezoelectric material and the metal plate of the piezoelectric element 320 via a contact point such as a solder point. The electric charge received at the one or more metal traces 345 may be conducted to a controller 325 by the metal trace 345 as described herein.

In an embodiment, the controller 325 may detect that electrical charge produced by the mechanical stress of the piezoelectric material of the piezoelectric element 320 and send an electrical haptic feedback control signal back to the piezoelectric material of the piezoelectric element 320. This electrical haptic feedback control signal may have a certain voltage, current, and polarity (−, +) sufficient to render the piezoelectric material of the piezoelectric element 320 to cause a haptic event, movement, or sound. The electrical haptic feedback control signal from the controller 325 may follow the same or a different metal trace 345 back to the piezoelectric element 320. The electrical haptic feedback control signal may be received at the piezoelectric material and metal plate of the piezoelectric element 320 via, for example, a contact point such as a solder point. Because the piezoelectric material of the piezoelectric element 320 receives the electrical haptic feedback control signal from the controller 325, this causes the piezoelectric material to generate a haptic event.

A response signal may be a sine wave, a square wave, a pulsed signal, or other waveform of changing current, voltage, or polarity applied to the piezoelectric element 320. As a result of the piezoelectric material stretching or contracting during the haptic event, the piezoelectric element 320 warp downward or upward with respect to the cavity 331 and may return back to a non-deformed state, thereby creating haptic feedback felt by the user's finger. In an embodiment, the relay of the electrical charge to the controller 325, the detection by the controller 325 of the electrical charge, and the return of the electrical haptic feedback control signal by the controller 325 to the piezoelectric element 320 may be sufficiently quick enough for the user to feel the haptic feedback in a manner that the user does not detect any temporal delay between the actuation of the key and the detection of the haptic feedback created at the piezoelectric element 320. In an embodiment, the relay of the electrical charge to the controller 325, the detection of the controller 325 of the electrical charge, and the return of the electrical haptic feedback control signal by the controller 325 to the piezoelectric element 320 may be on the order of microseconds. This operation of each of the keys of the keyboard 301 may be conducted every time the user actuates any key on the keyboard 301.

By applying voltage to each of the piezo elements 320 in a piezo haptic keyboard assembly, the controller 325 in an embodiment may control the factors influencing a user's tactile experience, including detecting any application of force applied to a key or touchpad. In some embodiments, the piezo elements 320 and controller 325 may control the amount of force a user must use to depress a key 301 or the touch pad 302 on the cover sheet 305, the speed and force with which each of the keycaps 301 returns to their neutral positions after being depressed, and the sound such an interaction generates, among other factors. In contrast to conventional keyboard assemblies, each of these factors may be adjusted, allowing for a wide range of tactile experiences for users via adjustment of a haptic response control signal to the piezo elements 320.

The controller 325 may receive instructions based on adjustable piezo element settings, and apply those settings to control the ways in which each of the piezo elements 320 in the piezo element layer deflects. For example, the controller 325 may control or set the degree to which a piezo element 320 in the piezo element layer must deform before it registers occurrence of a keystroke or a click of the touch pad 302. The controller 325 in an embodiment may also set the ways in which the piezo elements 320 in the piezo element layer beneath the cover sheet 305 deflect, in order to give the user a haptic experience similar to that of a conventional keyboard, or based on user input.

Figure 4:
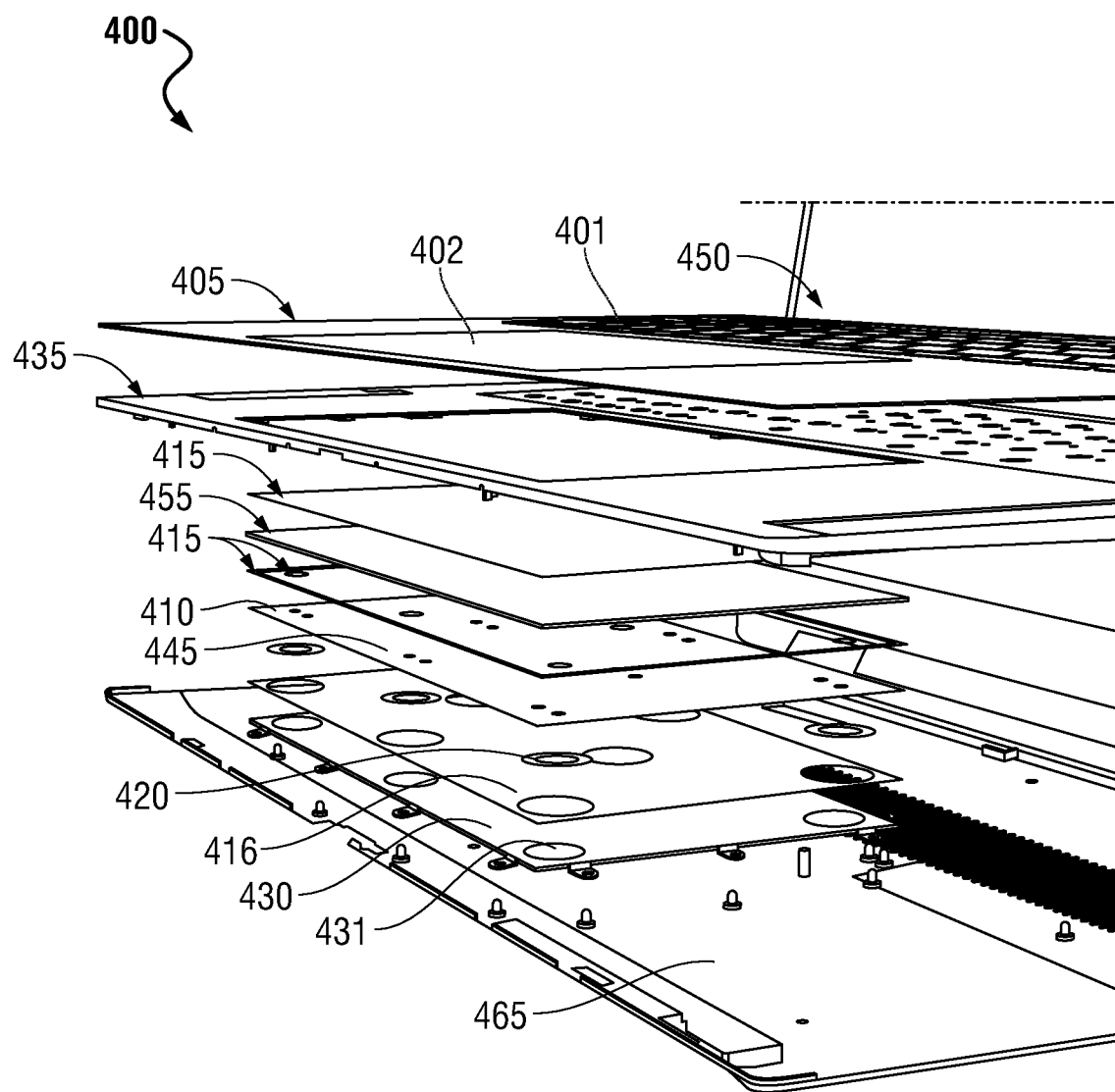
FIG. 4 is an exploded perspective view of a touchpad stack up for an information handling system according to another embodiment of the present disclosure.

FIG. 4 is an exploded perspective view of a touchpad stack up 400 of an information handling system according to another embodiment of the present disclosure. As described herein, the touchpad stack up 400 may also have a touchpad that implements the piezoelectric elements 420 described herein. The touchpad may be formed, in some embodiments, into a touchpad cover area 402 in coversheet layer 405. Coversheet 405 may also have a number of keys of a keyboard 401. Coversheet 405 may have one or both the haptic touchpad 402 and haptic keyboard 401 in some embodiments. In other embodiments, either the haptic touchpad 402 or keyboard 401 may be a conventional system. For example, a mechanical keyboard 401 may be implemented with a haptic touchpad 402. In another embodiment, the touchpad coversheet layer 405 may be separate from any other coversheet layer such as for the keyboard 401 or other portions of a C-cover.

The touchpad coversheet layer 405 with designated haptic touchpad country 402 may be made of any type of elastically resilient material. The elastically resilient material may allow, at least, a portion of the touchpad coversheet layer 405 to be deformed upon application of a pressure from a user's finger. Upon withdraw of the pressure from the user's finger, the material of the touchpad coversheet layer 405 is made of allows the touchpad coversheet layer 405 of the touchpad to bend back to its pre-deformed state. In an embodiment, the resilient material may allow the touchpad coversheet layer 405 at haptic touchpad 402 to travel a distance of between 0.01 mm and 2 mm.

The arrangement of the piezoelectric elements 420 for haptic touchpad 402 described herein is also shown in FIG. 4. In the embodiment shown in FIG. 4, piezoelectric elements 420 are placed in an array under the touchpad of the touchpad coversheet layer 405. The placement of the piezoelectric elements 420 in the array under the touchpad surface 402 of the touchpad coversheet layer 405 may include more or less than the number of piezoelectric elements 420 shown. As described herein, the operation of the touchpad may be dependent on the location and number of piezoelectric elements 420. During operation, a touchpad controller (not shown) similar to the controller described in connection with FIG. 3 may receive an electric charge from one or a plurality of piezoelectric elements 420 formed below and across the touchpad area 420 of coversheet layer 405 so that the controller may detect one or more piezoelectric elements 420 providing a signal depending on proximity underneath an x- and y-coordinate location of the actuation location on the touchpad by the user. The receipt of one or a plurality of electrical charges from these piezoelectric elements 420 may allow the controller to appropriately send a return electrical signal to any of the piezoelectric elements 420 so that the user may detect a haptic feedback at the location where the user has actuated the haptic touchpad 402 of the coversheet layer 405.

The coversheet 405 with haptic touchpad 402 may further include a C-cover substructure 435. The C-cover substructure 435 may be made of a rigid material that prevents little or no movement. The rigidity of the C-cover substructure 435 allows the other layers within the touchpad stack up 400 to be maintained within the information handling system. In an embodiment, the C-cover substructure 435 may be made to a metal.

The touchpad stack up 400, in an embodiment, may further include any number of adhesive layers 415. In an embodiment, a first adhesive layer 415 may mechanically couple the touchpad coversheet layer 405 to a capacitive touch layer 455. The capacitive touch layer 455 may be made of a rigid material such as a glass, biaxially-oriented polyethylene terephthalate (BoPET) such as Mylar® produced by DUPONT®, or a glass-reinforced epoxy such as FR4 to serve a purpose as a stiffening layer as well. The capacitive touch layer 455 includes a grid of drive and sense lines to determine x- and y-touch locations on haptic touchpad 402 by a user. The capacitive touch layer 455 may be placed within the layers of the touchpad to distribute forces from a user's finger across the surface of the touchpad coversheet layer 405 and to the nearest or a plurality of nearest piezoelectric elements 420 in the array formed below and across the bottom surface of the haptic touchpad 402 of the coversheet layer 405 and capacitive touch layer 455. The stiffening function of the capacitive touch stiffening layer 455 is an optional embodiment as a rigidity of the haptic touchpad 402 may be provided by other layers as well in other embodiments.

The first adhesive layer 415 may be include the placement of the adhesive at locations that may enhance the movement and prevent the hinderance of the actuation of the touchpad coversheet layer 405 at those locations across the touchpad coversheet layer 405 where piezoelectric elements 420 are present. In a specific embodiment, the first adhesive layer 415 may include placing the adhesive along borders of each of the piezoelectric elements 420 as well as placing the adhesive at a central location of each of the piezoelectric elements 420.

The contact foil layer 410 adhered to the touchpad coversheet layer 405 via the first adhesive layer 415 may be made of any elastically resilient material that, when any given location at the touchpad coversheet layer 405 is actuated or the contact foil layer 410 is bent towards a lower portion of the respective location, returns to its original state when the respective location is no longer being actuated.

In an embodiment, the contact foil layer 410 or the capacitive touch layer 455 may include a capacitive touch layer x and y grid that detects and measures anything that is conductive such as a user's finger. The drive lines and sense lines may be a grid of indium tin oxide (ITO) or other conductive materials arranged to detect capacitive changes at x and y locations across the capacitive touch layer that correspond to the touch interface cover layer of the haptic touchpad 402. The capacitive touch layer 455 may be a printed circuit board (PCB) layer for the detection of the user's finger at an x- and y-coordinate location across the surface of the area of the haptic touchpad 402 of the coversheet layer 405. The capacitive touch layer 455 may be an array of drive lines and sense lines of ITO formed on the capacitive touch stiffening layer 455 or on the contact foil 410 in an embodiment. Drive lines and sense lines may be operatively coupled to a capacitive touch controller for determining x- and y-location of touches on the haptic touchpad 402. The capacitive touch layer can be part of the contact foil layer 410, or the its own contact touch layer 455, or part of a stiffener layer in various embodiments.

The contact foil layer 410 may include a number of metal traces 445 formed thereon that electrically and communicatively couples each of the locations and corresponding piezoelectric elements 420 to a haptic keyboard controller (not shown) of an information handling system that includes a haptic feedback touchpad control system 132 such as described in connection with FIG. 1. Traces may be opposite the capacitive touch layer on contact foil layer 410 in an embodiment. In an embodiment, the controller may be a dedicated controller communicatively coupled to the contact foil layer 410 so as to detect electrical charges from the piezoelectric elements 420 and provide electrical signals back to the respective piezoelectric elements 420. In an alternative embodiment, the controller may be a processor of the information handling system that, among other computations and execution of other computer readable program code, also executes computer readable program code associated with the haptic feedback keyboard control system 132 as described in FIG. 1.

During operation of the touchpad, the contact foil layer 410 may receive an electrical charge from one or a plurality of piezoelectric elements 420 operatively coupled underneath the metal traces 445 that conduct the electrical charge to the controller associated with the keyboard 400. The metal traces 445 formed on the contact foil layer 410 may further be used to conduct a return electrical signal from the controller to the piezoelectric elements 420 so that the voltage and current of the return electrical haptic feedback control signal may cause the piezoelectric elements 420 to return to a haptic feedback event to the touchpad area 402. This haptic feedback event of the actuated piezoelectric elements 420 may cause a haptic feedback presented at the actuation location along the touchpad coversheet layer 405 that the user may feel. As described, the response electrical signal may be a sine wave, a square wave, a pulsed signal or other variations of voltage or polarity changes to generate a warping of a metal plate for the haptic feedback event. This haptic feedback may be relayed to the user within microseconds of the user actuating a location on the touchpad area 402 of the coversheet layer 405 such that the user physically detects a sensation that the touchpad coversheet layer 405 was pressed. This sensation felt by the user may be present, despite no actual mechanical devices, such as a click switch mechanism, a touchpad trigger, or other types of touchpad mechanical devices being present among the layers of the touchpad stack up 400. The haptic event in particular may feel like a click similar to a mechanical switch click upon a press for selection by a user.

The touchpad stack up 400 may further include a second adhesive layer 416 that mechanically couples the contact foil layer 410 to a support plate 430. In an embodiment, the second adhesive layer 416 may include an adhesive that includes the placement of an adhesive along borders of each piezoelectric element 420. As shown in FIG. 4, the second adhesive layer 416 includes circular voids that conform to a shape of each piezoelectric element 420 placed below the touchpad area 402 of the coversheet layer 405.

The support plate 430 may be made of rigid material such as a metal. The support plate 430 prevents deformation of the touchpad stack up 400 except for, in some embodiments, actuation levels of deformation at the contact foil layer 410, piezoelectric elements 420, the first adhesive layer 415, second adhesive layer 416, and other relevant layers as described. As such, the contact foil layer 410 may be allowed to detect the deformation of the piezoelectric elements 420. Additionally, a user using the touchpad stack up 400 may feel a level of rigidity in the area of the haptic touchpad 402 that the user actuates with the piezoelectric elements 420 providing a haptic event to mimic the deformation to occur when pressure is applied.

In an embodiment, the support plate 430 may include a number of cavities 431 formed therein. The cavities 431 may be sized to have a relatively smaller diameter than the diameter of each of the respective piezoelectric elements 420. By including these cavities 431, the piezoelectric elements 420 may be allowed to be deformed into the cavities 431 so that the deformation of the piezoelectric elements 420 creates the electrical charge described herein to detect actuation. The depth of the cavities 431 may also be selected to allow for at least a central portion of each piezoelectric elements 420 to be deflected into the cavities 431 some distance. This distance of deflection, in an embodiment, may be 0.1 mm or smaller or greater according to embodiments herein.

In an embodiment, the support plate 430 may be secured to other rigid elements of the information handling system. In an embodiment, the support plate 430 may be secured to the C-cover substructure 435 via a number of bolts, screws, or other mechanical or chemical coupling device. In some embodiments, the support plate 430 may be a part of the D-cover of the information handling system.

Each of the piezoelectric elements 420 may include a layer of piezoelectric material and a conductive metal plate layer as described herein in connection with the larger figures describing the keys in FIG. 2. Additionally, each piezoelectric element 420 of the touchpad stack up 400 may be operatively coupled to at least one metal trace 445 formed on the contact foil layer 410 via a contact point such as a solder point. In this embodiment, the conductive metal plate and the piezoelectric materials of the piezoelectric elements 420 may each be operatively coupled to at least one metal trace 445 formed on the contact foil layer 410 via a contact point such as a solder point. Thus, the contact foil layer 410 may, in an embodiment, include two metal traces 445 for each piezoelectric element 420 formed in the keyboard 400.

During operation of the touchpad of the keyboard 400, a user may actuate a location across the touchpad area 402 of the coversheet layer 405 by pressing down on that location of the touchpad coversheet layer 405. As a result of the mechanical stress placed on the location of the touchpad area 402 of the coversheet layer 405, one or more piezoelectric materials of the piezoelectric elements 420 associated with a location or neighboring locations of the actuation location may be compressed. This compression of the piezoelectric element 420 may create an electric charge indicating actuation. The electrical charge is carried to one or more metal traces 445 coupled to the piezoelectric elements 420 via contact points such as solder points. The electric charge received at the metal trace 445 may be conducted to a controller (not shown) by the metal traces 445 as described herein. In this embodiment, the controller may detect that electrical charge produced by the mechanical stress of the piezoelectric material of the piezoelectric element 420 and send an electrical signal back to the piezoelectric material of the piezoelectric element 420. This electrical response signal may have a certain voltage, current, and polarity sufficient to cause a stretching or contraction response to generate a haptic feedback event as described in various embodiments herein. The electrical signal from the controller may follow the same metal traces 445 back to the given piezoelectric element 420. The electrical signal may be received at a conductive layer of the piezoelectric element 420 via, for example, the contact points such as the solder points. As a result of the piezoelectric material may be made rigid and the piezoelectric element 420 may return back to a non-deformed state thereby creating haptic feedback felt by the user's finger. This haptic feedback effect may be a click mimicking a mechanical click switch. In an embodiment, the relay of the electrical charge to the controller, the detection of the controller of the electrical charge, and the return of the electrical signal by the controller to the piezoelectric element 420 may be sufficiently quick enough for the user to feel the haptic feedback in a manner that the user does not detect any temporal delay between the actuation touchpad coversheet layer 405 and the detection of the haptic feedback created at the or a plurality of piezoelectric elements 420. In an embodiment, the relay of the electrical charge to the controller, the detection of the controller of the electrical charge, and the return of the electrical signal by the controller to the piezoelectric element 420 may be on the order of microseconds.

The individual piezoelectric elements 420 may cooperate within the array to create the haptic feedback felt by the user at the touchpad coversheet layer 405. In some specific embodiments, the location of actuation by the user may be detected by the capacitive touch layer (either integrated into the contact foil layer 410, a separate capacitive touch layer 455, or with a stiffening layer) to indicate to the controller which piezoelectric elements 420 should receive a return electrical signal. Along with the receipt of an electrical charge from the piezoelectric elements 420, the controller may cause that all or a portion of the touchpad area forming the coversheet layer 405 receive haptic feedback. This may allow the haptic feedback to be felt by the user across the entire surface of the touchpad area 402 of the coversheet layer 405, across a left side of the touchpad area 402 of the coversheet layer 405, across a right side of the touchpad area 402 of the coversheet layer 405, across a top portion of the touchpad area 402 of the coversheet layer 405, across a bottom portion of the touchpad area 402 of the coversheet layer 405, or any specific area across the surface of the touchpad area 402 of the coversheet layer 405. In some embodiments, only a piezoelectric element 420 directly under the touch location or only piezoelectric elements 420 next to the nearest piezoelectric element 420 under the touch location may provide a haptic feedback event. Along with the capacitive touch layer, the piezoelectric elements 420 may allow a user to have the user's touch be detected at the touchpad while actuation, at any location across the surface of the touchpad coversheet layer 405 provides haptic feedback to the user so that the user can engage in a "click" action at the touchpad such as when selecting an item on a graphical user interface.

In an embodiment, the keyboard 400 may, once the layers described herein are coupled together, may be placed within the C-cover 435 with a D-cover 465 coupled thereto. The assembly of the coversheet 405, C-cover substructure 435, and the D-cover 465 forms a base chassis of the information handling system. In an embodiment, the base chassis may be coupled to a display chassis 450 that may include a display device. The touchpad stack up 400 described herein may allow the user to provide input to the display device of the display chassis using the capacitive touch layer, the piezoelectric elements 420 determining actuation, and the haptic feedback capabilities associated with the piezoelectric elements 420. By way of example, the capacitive touch layer may allow a user to move a cursor across the screen. In these examples, actuation of the touchpad coversheet layer 405 at a location across the touchpad coversheet layer 405 causes an item to be selected that is represented on the display device. This "click" action may provide similar input to the processor of the information handling system similar to that of a mouse click.

Figure 5:
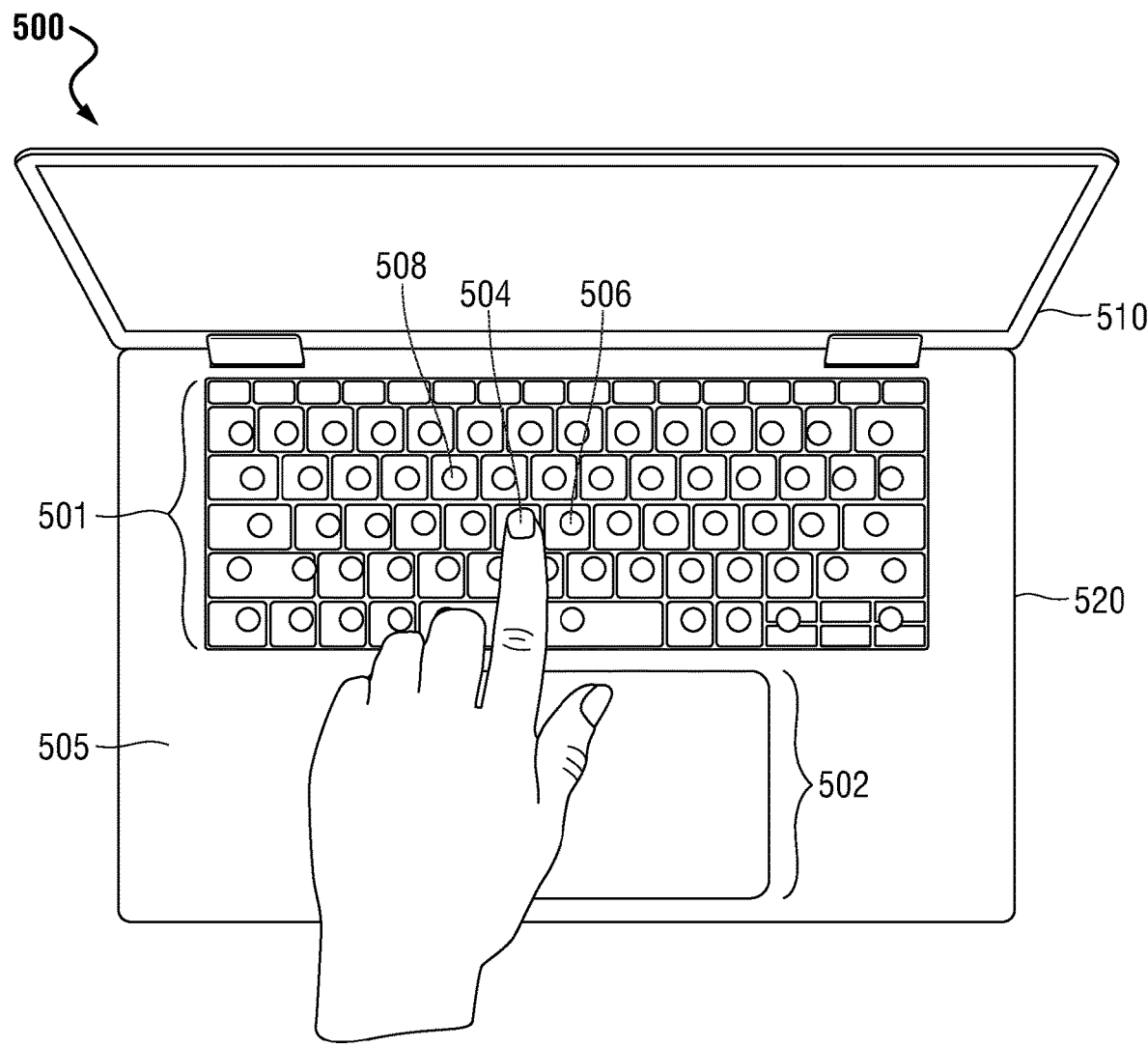
FIG. 5 is a graphical diagram illustrating a piezo haptic keyboard and haptic touchpad in an information handling system according to an embodiment of the present disclosure.

FIG. 5 is a graphical diagram illustrating deformation of a plurality of piezo elements situated within a set area of force detection pursuant to downward force applied by a user according to an embodiment of the present disclosure. FIG. 5 shows an information handling system 500 implementing a haptic keyboard area 501 and a haptic touchpad area 502 of a coversheet for a base chassis 520 of the information handling system according to embodiments herein. Information handling system 500 includes the base chassis 520 which may house the haptic keyboard 501 and the haptic touchpad 502 including the stack up layers of each as described in embodiments herein. Further, the C-cover of the base chassis 520 may include the coversheet 505 that operates to provide user interface locations for keys of haptic keyboard 501 and for a touchpad interface area for haptic touchpad 502. The base chassis 520 may further house components of the information handling system including processor, graphics processor, motherboard, graphics board, bus systems, power and battery systems, wireless systems, thermal controls, data and power ports, and other components in accordance with the description of FIG. 1. Those components may be installed according to techniques understood by those of skill. Further, base chassis 520 may be hinged to a display chassis for housing a display device and other components according to embodiments herein.

As described herein, a separate piezo element may be situated directly beneath each key cap within the cover sheet in some embodiments. In other embodiments, a plurality of piezo elements may be distributed horizontally across a layer disposed beneath the cover sheet, but the placement of each of the plurality of piezo elements may not directly correspond to the location of individual keys within the cover sheet. For example, in some embodiments, a single piezo element may be situated directly beneath a point 504 on the cover sheet at which the user applies a downward force. In one such embodiment, only a single piezo element (not shown) situated directly beneath the point 504 may deform, causing the controller to register a keystroke. In another such embodiment, the downward force applied at point 504 may cause some deflection of piezo elements 506 or 508, situated nearby the point 504, but not directly beneath it.

In other embodiments, the point 504 on the cover sheet at which the user applies downward force may not be situated directly above a single piezo element. In such an embodiment, the downward force applied at point 504 may cause full or partial deflection of one or more of the nearby piezo elements 506 or 508. Determination of the degree to which each of the piezo elements 506 and 508 deflect in such embodiments may be used to triangulate the center of the downward force applied at point 504. Because some of these piezo elements may be situated beneath the base chassis top cover, where a user may rest her palms while typing, the degree to which each of these piezo elements deflect may indicate placement of a user's palms upon the base chassis top cover at a given point in time in some embodiments.

Figure 6:
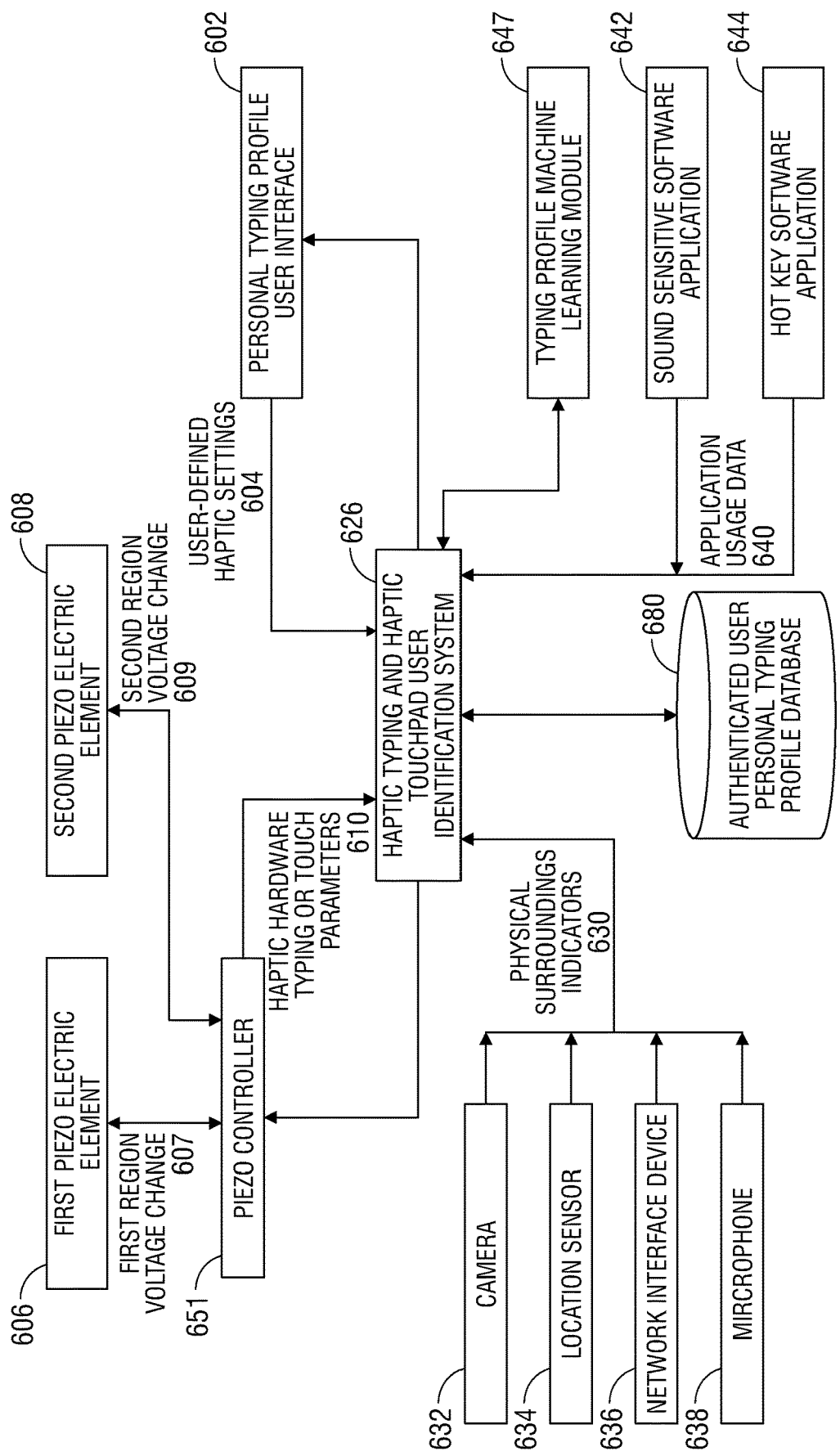
FIG. 6 is a block diagram illustrating a keyboard and touchpad user identification system allowing information handling system access to a user according to an embodiment of the present disclosure.

FIG. 6 is a block diagram illustrating a keyboard and touchpad user identification system allowing information handling system access to a user having typing behaviors matching an authorized user's personal typing profile according to an embodiment of the present disclosure. Such a personal typing profile in an embodiment may be made based on monitored user typing behavior. In some embodiments, the personal typing profile may also take into account recorded user-defined haptic settings, physical surroundings indicators, and application usage data, for example. The keyboard and touchpad user identification system 626 in an embodiment may communicate with a piezo controller 651, a personal typing profile user interface 602, one or more software applications, and a plurality of environmental sensors to develop and apply a personal typing profile for a given user.

The piezo controller 651 in an embodiment may transmit haptic hardware typing or touch behavior parameters 610 to the keyboard and touchpad user identification system 626, including metrics describing how a user interacts with the keyboard and touchpad. As described herein, the controller 651 may be operably attached to a contact foil layer affixed to a plurality of piezo elements, such as 606 and 608. The plurality of piezo elements in an embodiment may deflect upon downward pressure applied by the user to the keyboard or the touch pad in an embodiment. For example, a first piezo electric element 606 may be situated beneath a first region of cover sheet, such as beneath a first key within the keyboard, and a second piezo electric element 608 may be situated beneath a second region of the cover sheet, such as beneath a second key within the keyboard. As a user applies a downward force in the first region (e.g., on the first key) in such an embodiment, the first piezo element 606 may deflect, applying an electrical current to the traces of the contact foil layer, and generate a voltage change 607 across the contact foil layer. The controller 651 may be operably connected to the contact foil layer and capable of associating the voltage change 607 with an indication that a keystroke above the first piezo electric element 606 has occurred. Similarly, as the user applies a downward force on the second region (e.g., on the second key) in such an embodiment, the second piezo element 608 may deflect, and generate a voltage change 609 across the contact foil layer, causing the controller to determine that a keystroke above the second piezo electric element 608 has occurred.

In other embodiments, the first piezo element 606 or second piezo element 608 may each be situated partially beneath a plurality of keys on the keyboard, or partially or fully beneath the touch pad. In still other embodiments, one of the first piezo element 606 or the second piezo element 608 may be situated beneath the base chassis top cover where a user may rest her palms while typing. Such piezo elements situated beneath the portion of the base chassis top cover where a user rests her palms while typing may operate to detect placement of the user's palms by deflecting under the weight of the user's palms as she rests them.

The voltage changes 607 and 609 in embodiments may further indicate the degree to which the piezo elements 606 and 608 deflected, indicating the force with which the user depressed the key or the touchpad situated atop the piezo elements 606 and 608, or the location of the user's palms on the base chassis top cover while typing. Further, by monitoring such voltage changes (e.g., 607 and 609) for each of the plurality of piezo elements within the piezo element layer in an embodiment, and aggregating such notifications over time, the piezo controller 651 may identify the locations of keystrokes and clicks for given keys or the touch pad (e.g., roughly within the center of the key or touch pad, or corner strikes), placement of a user's palms with respect to the keyboard, an average duration of keystrokes or touch pad clicks, force of keystrokes, pauses or intervals in typing, and an overall typing speed. Detection of downward pressure at multiple piezo elements may be used in some embodiments to triangulate a strike location. This may occur in embodiments where a plurality of piezo elements are situated beneath the touch pad, or where the piezo elements are not situated directly beneath a single key of the keyboard. For example, the piezo controller 651 in such an embodiment may compare voltage changes (each indicating a different degree of deflection) across two piezo elements situated nearby one another to determine the center of the keystroke, or the point at which the downward deflection of the coversheet is greatest. The piezo controller 651 or the keyboard and touchpad user identification system 626 in an embodiment may also monitor, record, or recognize combinations in these parameters 610 that tend to coincide in occurrence. For example, the haptic hardware typing or touch behavior parameters 610 in an embodiment may indicate a given user often presses the backspace key following a corner strike of a particular key or of multiple keys. As another example, the haptic hardware typing or touch behavior parameters 610 in an embodiment may indicate a given user consistently uses two spaces following a period, rather than one, or vice versa. As yet another example, the haptic hardware typing or touch behavior parameters 610 may indicate the user is more likely to click the touch pad with her right hand, or identify a general region of the touch pad in which the user most likely clicks.

Changes in one or more of these metrics in an embodiment may indicate a change in users. These are only a few examples of behavior parameters that may be monitored and communicated to the typing profile personalization system 626 in an embodiment. Other embodiments contemplate any monitored metrics regarding keyboard or touchpad usage. The keyboard and touchpad user identification system in an embodiment may apply machine learning methods to detects patterns in these haptic hardware typing or touch behavior parameters 610 for a known, authorized user of the information handling system in order to develop a personal typing profile for that authorized user. Such a personal typing profile in an embodiment may describe aspects of that authorized user's typing behavior that may be used to differentiate that user from other users that should not have access to the information handling system.

In some embodiments, the personal typing profile for an authorized user may also be based on detected patterns in user-defined haptic settings 604, physical surroundings indicators 630, or application usage data 640 received simultaneously with the haptic hardware typing or touch behavior parameters 610 by the keyboard and touchpad user identification system 626. A personal typing profile determined based on an identified pattern that includes a combination of haptic hardware typing or touch behavior parameters 610, user-defined haptic settings 604, physical surroundings indicators 630, or application usage data 640 in an embodiment may increase the likelihood of accurately distinguishing an authorized user from another user.

The keyboard and touchpad user identification system 626 in an embodiment may also receive user-defined haptic settings 604 from the personal typing profile user interface 602. As described herein, by receiving voltage or applying a varying voltage of a haptic control signal to each of the piezo elements in a piezo haptic keyboard assembly, a controller may control several factors influencing a user's tactile experience, including the force she must use to depress a key, the speed and force with which each of the keycaps provides a haptic response signal and then returns to its neutral position after being depressed, and the sound such an interaction generates, among other aspects. A user may adjust each of these factors, for example, using the personal typing profile user interface 602 in an embodiment according to their personal preferences. For example, a user may adjust the force threshold required for the controller to register that a keystroke has occurred, and the size of the area in which the user must apply such a force in order for the controller to register a keystroke, for example as a sensitivity level and with neighboring piezo elements detecting location of a keystroke on a key. As another example, a user may adjust the intensity, duration, and sharpness at which a piezo element vibrates or provides other haptic sensory feedback following registering a keystroke, and the burst count and interval of sustained vibrations occurring in response to use of specific applications. As the user adjusts one or more of these settings in an embodiment, the personal typing profile user interface 602 may transmit these user-defined haptic settings 604 to the keyboard and touchpad user identification system 626 to indicate a user's preferences at a given time. These are only a few examples of user-defined haptic settings 604 that may be received by the typing profile personalization system 626 in an embodiment. Other embodiments contemplate any adjustable settings for a piezo haptic keyboard or touchpad assembly.

The keyboard and touchpad user identification system 626 in an embodiment may also receive physical surroundings indicators 630 from one or more environmental sensors. For example, physical surroundings indicators 630 in an embodiment may include images, videos, or ambient light measurements captured by a camera 632. Images captured by the camera 632 in an embodiment may be used by the camera 632, an image processing application, or by the keyboard and touchpad user identification system 626 for facial recognition, measurement of biometrics (e.g., infrared temperature measurement), or object recognition (e.g., detecting whether the user is in a crowded area). The physical surroundings indicators 630 in an embodiment may include such biometric measurements, object recognition determinations, or facial recognition determinations. Such camera-based physical surroundings indicators 630 in an embodiment may describe a user's ambient surroundings, such as whether the user is in a crowded or secluded environment, whether the user is working in a darkened room or outside during the day, or whether the user's biometric measurements indicate the user is stressed, fatigued, or relaxed, for example.

The physical surroundings indicators 630 in an embodiment may also include a determination of a current location of the information handling system. Such a location determination may take the form of Global Positioning Satellite (GPS) coordinates, other geographic locations (e.g., city, state, country), or known user-defined locations (e.g., work, home). Determination of the location may be made based on GPS triangulation, IP address of a connected network, or other geolocation methods known in the art.

In an embodiment, the physical surroundings indicators 630 may also include identification of a connected network. For example, the network interface device 636 of the information handling system may transmit an identification of a wired or wireless network with which it has established a connection to the keyboard and touchpad user identification system 626. Such information may be used to identify the location of the user, or to establish that the user is in transit. For example, if the network interface device 636 establishes a WLAN connection with a stationary access point over a long duration of time, it may be determined that the information handling system is roughly stationary. In contrast, if the network interface device 636 cannot establish a WLAN or WWAN signal, and either relies on a cellular signal to connect to the internet, or does not establish a connection with the internet at all, it may be determined the information handling system is travelling at a relatively high rate of speed (e.g., travelling via plane or car).

The physical surroundings indicators 630 in an embodiment may also include sound indicators captured by a microphone 638. A microphone 638 may capture ambient sound surrounding the information handling system, or may capture voice commands spoken aloud by a user in some embodiments. Ambient sound may indicate whether a user is in a relatively secluded space or in a crowded area surrounded by other people. Indicators 630 transmitted from the microphone 638 in an embodiment may also include indication that the user is engaged in an audio conversation with another person located within the same room, via a phone not included within the information handling system, or via a voice conferencing application running on the information handling system. These are only a few examples of environmental condition indicators that may be monitored and communicated to the keyboard and touchpad user identification system 626 in an embodiment. Other embodiments contemplate any information received from a sensor device, including Internet of Things (IoT) sensors, thermometers, biometric sensors (e.g., heart rate monitors, blood pressure monitors), or humidity sensors, for example.

The keyboard and touchpad user identification system 626 in an embodiment may also receive application usage data 640 from one or more applications running on the information handling system. For example, the information handling system in an embodiment may run a sound sensitive software application 642 or a hot key software application 644. A sound sensitive software application 642 may be one that operates best in quieter ambient surroundings, such as, for example, audio and video conferencing applications. A hot key software application 644 in an embodiment may include applications that employ one or more keys or the touch pad to perform an action within the application, other than typing of the letter represented by the key. For example, a computer game that uses the "F" key to fire a weapon may comprise such a hot key software application 644. In other embodiments, application usage data 640 may include information managed by an application, such as, for example, a user's schedule indicating appointments, tasks, etc. These are only a few examples of application data usage metrics that may be monitored and communicated to the keyboard and touchpad user identification system 626 in an embodiment. Other embodiments contemplate any usage metrics routinely gathered for purposes of analytics, security assessment, or network/enterprise optimization, for example. In addition, the keyboard and touchpad user identification system 626 may receive metrics for peripheral devices operably connected to the information handling system and in active use. For example, the application usage metrics may describe whether or how a user is engaging with an operably connected printer, mouse, removable hard drive, head mounted display, controller glove, or other gaming controller. Further, any of the behavioral parameters 610, user-defined haptic settings 604, physical surroundings indicators 630, or application usage data 640 may be recorded at a specific information handling system (e.g., the information handling system upon which code instructions of the keyboard and touchpad user identification system 626 are currently being executed), across a plurality of information handling systems operated by the same user over time, or may be drawn from a plurality of information handling systems operated by a plurality of users in a crowd-sourced information gathering method.

Upon receiving the haptic hardware typing or touch behavior parameters 610, the user-defined haptic settings 604, the physical surroundings indicators 630, and the application usage data 640 a typing profile machine learning module 647 may be used to identify patterns in haptic hardware typing or touch behavior parameters 610 that repeat, or in a combination of parameters 610, settings 604, indicators 630, or metrics 640 that may be used to differentiate an authorized user from another user. The typing profile machine learning module 647 in an embodiment may detect such patterns in an embodiment based on any machine learning or neural network methodology known in the art or developed in the future. For example, the typing profile machine learning module 647 in an embodiment may model the relationships between each of the haptic hardware typing or touch behavior parameters 610, user-defined haptic settings 604, physical surroundings indicators 630, and application usage data 640 using a layered neural network topology. Such a neural network in an embodiment may include a plurality of layers, where each layer includes a plurality of nodes representing metric values or states for each of the parameters 610, and optionally, settings 604, indicators 630, or usage data 640. An input layer to the neural network, for example, may include a known, recorded set of values for each of these parameters 610, and optionally, settings 604, indicators 630, and usage data 640 metrics. An output layer to the neural network may include a subset of these parameters 610, and optionally, a subset of the settings 604, indicators 630, and usage data 640 that are likely to be unique to an authorized user.

The typing profile machine learning module 647 in an embodiment may attempt to determine the degree to which each of these haptic hardware typing or touch parameters 610, settings 604, indicators 630, and usage data 640 metrics can be used to differentiate the authenticated user from other users by assigning preliminary weight matrices to each of the nodes in a given layer. Each assigned weight value in the matrix may describe a likelihood that one of these parameters 610, and optionally, one of the settings 604, indicators 630, and usage data 640 metrics uniquely describes the behaviors, preferences, or physical surroundings of a specific, known, and authorized user. The neural network may be modeled using any number of layers, and the nodes in each additional layer may be determined based on the value of the nodes in the previous layer and the weight matrices describing likelihood of the haptic hardware typing or touch parameters 610, settings 604, indicators 630, or usage data 640 metrics may uniquely define an authorized user. In other words, each new layer in the neural network may include a plurality of nodes representing a best guess of how each of these parameters 610, settings 604, indicators 630, or usage data 640 metrics may uniquely identify an authorized user or distinguish an authorized user from an unauthorized user. A greater number of layers within the neural network topology may decrease the likelihood of divergence (yielding unusable results), but may increase processing time. The neural network may then produce an output layer including a plurality of nodes, each representing a value for a haptic hardware typing or touch behavior parameter 610, and optionally, a value for a user-defined haptic setting 604, a physical surrounding indicator 630, or an application usage data 640 metric that is projected to accurately identify an authorized user or to accurately distinguish between an authorized user and an unauthorized user. The process of generating an output layer, based on a known set of input layer values may be described herein as forward propagation. An initial forward propagation in an embodiment may project a pattern of haptic hardware typing or touch behavior parameters 610 values recorded over a short period of time the keyboard and touchpad user identification system identifies as likely to distinguish an authorized user from other users. In some embodiments, such a projected pattern may also include one or more values of user-defined haptic settings 604, physical surroundings indicators 630, or application usage data 640 recorded during the same short period of time.

The typing profile machine learning module 647 in an embodiment may compare the values in the output layer generated in such an initial forward propagation with haptic hardware typing or touch behavior parameters 610, user-defined haptic settings 604, physical surroundings indicators 630, or application usage data 640 recorded during a later period of time. In such a way, the typing profile machine learning module 647 may compare its projected pattern of haptic hardware typing or touch behavior parameters 610 unique to the authorized user with freshly gathered haptic hardware typing or touch behavior parameters 610 also describing the typing behavior of the same authorized user. The typing profile machine learning module 647 may then determine a degree of error associated with each projected value (e.g., associated with each node in the output layer of the neural network). In other words, the typing profile machine learning module 647 in an embodiment may compare its projected pattern describing the behavior of the authorized user to more current measurements of the ways in which the same authorized user interacts with the keyboard and touchpad. In such a way, the typing profile machine learning module 647 may gauge the degree to which its projected pattern matches the actual behavior of the authorized user. The typing profile machine learning module 647 may then use these known error margins to adjust the weight matrices associated with each layer of the modeled neural network. For example, the typing profile machine learning module 647 may perform a back-propagation method to adjust each of the weight matrices in order to more accurately reflect the likelihood that each of the values of the haptic hardware typing or touch behavior parameters 610 uniquely describes the authorized user. Since the metrics of the haptic hardware typing or touch behavior parameters 610 may repeat when an authorized user types on the haptic keyboard or uses the haptic touch pad, the typing profile machine learning module 647 may make an association of some combination of haptic hardware typing or touch behavior parameters 610 and their recorded values with the authenticated user to yield an authenticated user personal typing profile.

The typing profile machine learning module 647 in an embodiment may perform this forward propagation and backward propagation, using different input node values repeatedly to finely tune the weight matrices. For example, the typing profile machine learning module 647 may perform this forward propagation and backward propagation repeatedly during a training session or initial setup period to learn patterns in one or more of these haptic hardware typing or touch behavior parameters 610, or optionally in the user-defined haptic settings 604, physical surroundings indicators 630, or application usage data 640 that may be uniquely attributable to the known, authorized user. The typing profile machine learning module 647 in an embodiment may perform such forward and backward propagation in an embodiment until the difference between the output layer values in the most recent iteration and the current iteration fall within a preset threshold percentage of one another. For example, if the average value of each output node in the most recent iteration only differs by a threshold percentage value (e.g., one percent, one-half percent, or five percent) from the value of the same output node in the current iteration, it may be determined the pattern described by the output layer is sufficiently accurate to uniquely identify the authorized user. In such a scenario, the typing profile machine learning module 647 in an embodiment may end the training session, and store the output layer node values for the current iteration as an authenticated user personal typing profile in the authenticated user personal typing profile database 680. The stored output layer node values of the authenticated user personal typing profile in the authenticated user personal typing profile database 680 may then be associated with the authorized user.

Figure 7:
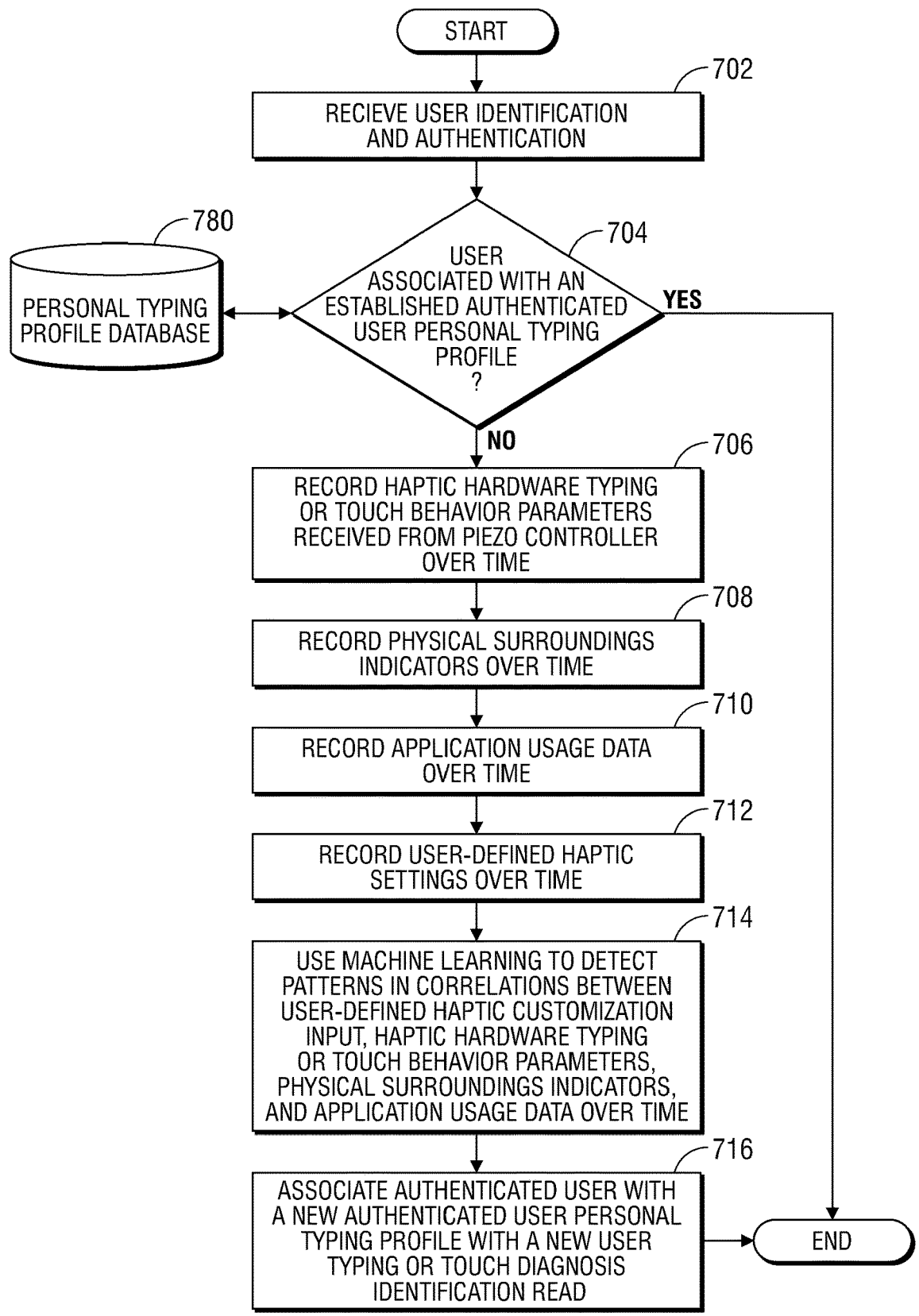
FIG. 7 is a flow diagram illustrating a method of creating an authenticated user personal typing profile according to an embodiment of the present disclosure.

FIG. 7 is a flow diagram illustrating a method of creating a personal typing profile describing a determined pattern of haptic hardware typing or touch behavior parameter values for an authenticated user according to an embodiment of the present disclosure. As described herein, the piezo haptic keyboard controller in embodiments described herein may detect and record various metrics describing the dynamics of the piezo haptic keyboard assembly in use by a specific user over time as a means of identifying that user. The combination of specific values (e.g., force, location, and duration of keystrokes, or typing speed) for each of these recorded user haptic hardware typing or touch behavior parameters may be specific to individual users in that repeated patterns of values for the haptic hardware typing or touch behavior parameters may emerge continuously as a user types on a haptic keyboard or uses a haptic touchpad. Such detection of combinations of haptic hardware typing or touch behavior parameters may provide an accurate gauge for distinguishing between users.

At block 702, a user identification or authentication may be received. User identification in an embodiment may include, for example, a user providing a username and password to establish that user is authorized to access the information handling system. In other embodiments, other forms of user identification are contemplated. For example, user identification may include biometric identification (e.g., fingerprint scan, retinal scan, facial recognition, voice recognition). In still other embodiments, a user may place a key fob or signal propagating peripheral device within a scanning area surrounding the information handling system, or may engage in a multi-step authentication process (e.g., additionally providing a numeric code transmitted to a known, secure device). Any known method of authentication, either currently in use or developed in the future, that is capable of identifying an individual user or associating an individual user with a known account is contemplated herein.

The keyboard and touchpad user identification system in an embodiment may determine at block 704 whether the user is associated with an established authenticated user personal typing profile. As described herein, the keyboard and touchpad user identification system in an embodiment may use a machine learning method to identify a pattern of recorded haptic hardware typing or touch behavior parameters for a specific user. Upon identification of such a pattern in an embodiment, the keyboard and touchpad user identification system may store the output layer node values, representing an authenticated user personal typing profile for an individual user within the authenticated user personal typing profile database 780. The keyboard and touch pad user identification system in an embodiment may access the authenticated user personal typing profile database 780 to determine whether the user identified at block 702 is associated with an authenticated user personal typing profile. If the user is not associated with an authenticated user personal typing profile, the method may proceed to block 706 to begin a training session for creation of a personal typing profile for the user identified at block 702. If the user is associated with an authenticated user personal typing profile in an embodiment, creation of a new personal typing profile may not be necessary, and the method may end.

In an embodiment in which the identified user is not associated with an established authenticated user personal typing profile, the keyboard and touchpad user identification system may initiate a training session, during which it may record haptic hardware typing or touch behavior parameters received from the piezo controller over time at block 706. For example, in an embodiment described with respect to FIG. 6, the piezo controller 651 in an embodiment may transmit haptic hardware typing or touch behavior parameters 610 to the keyboard and touchpad user identification system 626, including metrics describing how a user interacts with the keyboard and touchpad. The piezo controller 651 in an embodiment may monitor changes in voltage magnitude or polarity (e.g., 607 or 609) occurring upon deflection of a plurality of piezo elements (e.g., 606 and 608) in an embodiment, indicating occurrence of keystrokes or clicks of a touch pad. The voltage changes 607 and 609 in embodiments may further indicate the degree to which the piezo elements 606 and 608 deflected, indicating the force with which the user depressed the key or the touchpad situated atop the piezo elements 606 and 608. Further, by monitoring such voltage changes (e.g., 607 and 609) for each of the plurality of piezo elements within the piezo element layer in an embodiment, and aggregating such notifications over time, the piezo controller 651 may identify the locations of keystrokes and clicks for given keys or the touch pad (e.g., roughly within the center of the key or touch pad, or corner strikes), an average duration of keystrokes or touch pad clicks, pauses or intervals in typing, and an overall typing speed. In some embodiments, the piezo controller 651 may detect and log occurrences when a corner strike is detected and immediately followed by the user pressing backspace or delete. In such an embodiment, the piezo controller 651 may also categorize these occurrences as potential mistypes, prompting a need for decreased sensitivity of corner strikes at one or more piezo elements. Changes in one or more of these metrics in an embodiment may indicate a change in users. These metrics may then be transmitted to the keyboard and touchpad user identification system 626 as haptic hardware typing or touch behavior parameters 610 in an embodiment.

At block 708, the keyboard and touchpad user identification system in an embodiment may record physical surroundings indicators over a period of time. For example, in an embodiment described with reference to FIG. 6, the keyboard and touchpad user identification system 626 may receive physical surroundings indicators 630 from one or more environmental sensors. Images captured by the camera 632 in an embodiment, for example, may describe a user's ambient surroundings, such as whether the user is in a crowded or secluded environment, whether the user is working in a darkened room or outside during the day, or whether the user's biometric measurements indicate the user is stressed, fatigued, or relaxed, for example. A user's typing behavior, as reflected by the haptic hardware typing or touch behavior parameters recorded during a training session may vary as the user becomes stressed, fatigued, or relaxed. As another example, location data as measured by a location sensor 634 may be included within the physical surroundings indicators 630. As yet another example, the network interface device 636 of the information handling system may transmit an identification of a wired or wireless network with which it has established a connection. Such information may be used to identify the location of the user, or to establish that the user is in transit. In still another example, a microphone 638 may capture ambient sound surrounding the information handling system, or may capture voice commands spoken aloud by a user in some embodiments. In some embodiments, this block may be skipped, and the keyboard and touchpad user identification system may create an authenticated user personal typing profile based solely on the haptic hardware typing or touch behavior parameter values for the identified user gathered at block 706.

The keyboard and touchpad user identification system in an embodiment may record application usage data over time at block 710. For example, in an embodiment described with reference to FIG. 6, the keyboard and touchpad user identification system 626 in an embodiment may receive application usage data 640 from one or more applications (e.g., a sound sensitive software application 642 or a hot key software application 644) running on the information handling system. A sound sensitive software application 642 may be one that operates best in quieter ambient surroundings, such as, for example, audio and video conferencing applications. A hot key software application 644 in an embodiment may include applications that employ one or more keys or the touch pad to perform an action within the application, other than typing of the letter represented by the key. The user's typing behaviors may vary based on the application in usage at a given time. For example, a user may type more aggressively (e.g., with greater force) when playing a computer game than when drafting a document in a word processing application. In some embodiments, this block may be skipped, and the keyboard and touchpad user identification system may create an authenticated user personal typing profile based solely on the haptic hardware typing or touch behavior parameter values for the identified user gathered at block 706.

At block 712, the keyboard and touchpad user identification system in an embodiment may record user-defined haptic settings over time. For example, in an embodiment described with reference to FIG. 6, the keyboard and touchpad user identification system 626 in an embodiment may receive user-defined haptic settings 604 from the personal typing profile user interface 602. As described herein, a user may adjust several factors governing dynamics of the piezo haptic keyboard assembly, including, for example, the force threshold required for the controller to register that a keystroke has occurred, and the size of the area in which the user must apply such a force in order for the controller to register a keystroke. As another example, a user may adjust the intensity, duration, and sharpness at which a piezo element moves between an upward warped position, downward position, or neutral position following registering a keystroke, and the burst count and interval of sustained movements occurring in response to use of specific applications. As the user adjusts one or more of these settings in an embodiment, the personal typing profile user interface 602 may transmit these user-defined haptic settings 604 to the keyboard and touchpad user identification system 626 to indicate a user's preferences at a given time.

The keyboard and touchpad user identification system in an embodiment may user a machine learning algorithm to detect patterns in haptic hardware typing or touch behavior parameters, and physical surroundings indicators, application usage data, or user-defined haptic settings at block 714. For example, in an embodiment described with respect to FIG. 6, upon receiving the haptic hardware typing or touch behavior parameters 610, the user-defined haptic settings 604, the physical surroundings indicators 630, or the application usage data 640 a typing profile machine learning module 647 may identify patterns in haptic hardware typing or touch behavior parameters 610, or in a combination of parameters 610, settings 604, indicators 630, or metrics 640 that may be used to differentiate an authorized user from another user. The typing profile machine learning module 647 in an embodiment may establish an authenticated user personal typing profile for an authorized user based solely on patterns detected in haptic hardware typing or touch behavior parameters 610 over a training session, for example. The typing profile machine learning module 647 in an embodiment may model patterns in haptic hardware typing or touch behavior parameters 610 using a layered neural network topology. Such a neural network in an embodiment may include a plurality of layers, where each layer includes a plurality of nodes representing metric values or states for each of the haptic hardware typing or touch behavior parameters 610. An input layer to the neural network, for example, may include a known, recorded set of values for each of these parameters 610, as received or recorded at block 706. An output layer to the neural network may include a subset of values for these parameters 610 that are likely to be unique to an authorized user when recorded simultaneously or contemporaneously in combination with one another.

The typing profile machine learning module 647 in an embodiment may attempt to determine the degree to which the combination of this subset of values for the haptic hardware typing or touch behavior parameters can be used to differentiate the authenticated user from other users by assigning preliminary weight matrices to each of the nodes in a given layer. Each assigned weight value in the matrix may describe a likelihood that one of these haptic hardware typing or touch behavior parameter values uniquely describes the behaviors a specific, known, and authorized user identified at block 702. The neural network may then forward propagate to produce an output layer including a plurality of nodes, each representing a value for a haptic hardware typing or touch behavior parameter that is projected to accurately identify an authorized user or to accurately distinguish between an authorized user and an unauthorized user. An initial forward propagation in an embodiment may project a pattern of haptic hardware typing or touch behavior parameters values that the keyboard and touchpad user identification system identifies as likely to distinguish the authorized user identified at block 702 from other users.

The typing profile machine learning module 647 in an embodiment may compare the values in the output layer generated in such an initial forward propagation with haptic hardware typing or touch behavior parameters recorded at block 706. The typing profile machine learning module 647 in an embodiment may perform this forward propagation and comparison repeatedly during the period of time (e.g., training session) over which the haptic hardware typing or touch behavior parameters are recorded at block 706. In such a way, the typing profile machine learning module 647 may compare its pattern of haptic hardware typing or touch behavior parameter values projected to be unique to the authorized user with freshly gathered haptic hardware typing or touch behavior parameter values also describing the typing behavior of the same authorized user. The typing profile machine learning module 647 may then determine a degree of error associated with each projected value (e.g., associated with each node in the output layer of the neural network). In other words, the typing profile machine learning module 647 in an embodiment may compare its projected pattern describing the behavior of the authorized user to more current measurements of the ways in which the same authorized user interacts with the keyboard and touchpad. In such a way, the typing profile machine learning module 647 may gauge the degree to which its projected pattern matches the actual behavior of the authorized user. The typing profile machine learning module 647 may then use these known error margins to perform a backward propagation and adjust the weight matrices associated with each layer of the modeled neural network.

The typing profile machine learning module 647 in an embodiment may perform such forward and backward propagation in an embodiment until the difference between the output layer values in the most recent iteration and the current iteration fall within a preset threshold percentage of one another. For example, if the average value of each output node in the most recent iteration only differs by a threshold percentage value (e.g., one percent, one-half percent, or five percent) from the value of the same output node in the current iteration, it may be determined the pattern described by the output layer is sufficiently accurate to uniquely identify the authorized user. In contrast, if the output node of the current iteration includes a value for a haptic hardware typing or touch behavior parameter that was not included in the output layer of the most recent iteration, the typing profile machine learning module 647 may determine the current iteration is not sufficiently accurate to uniquely identify the authorized user.

In some embodiments, the input layer for the neural network may include one or more values for the recorded physical surroundings indicators, application usage data metrics, or user-defined haptic settings, in addition to values for one or more haptic hardware typing or touch behavior parameters. In such embodiments, the output layer may include a combination of values for haptic hardware typing or touch behavior parameters and one or more values for the physical surroundings indicators recorded at block 708, application usage data metrics recorded at block 710, or user-defined haptic settings recorded at block 712. Each of these additional indicators, metrics, and settings, when placed in combination with haptic hardware typing or touch behavior parameters, may more uniquely identify a given user. For example, the physical surroundings indicators may indicate a time of day, or whether the user is fatigued. The user's typing behavior, as reflected in one or more values of haptic hardware typing or touch behavior parameters may vary based on the time of day (e.g., morning vs. evening), or when the user is fatigued. As another example, the application usage data metrics in an embodiment may describe which application (e.g., computer game vs. word processing application) the user is interacting with during the training session, which may also affect the user's typing behavior (e.g., more aggressive vs. less aggressive). As yet another example, the user-defined haptic settings indicating the tactile response the user wishes to experience while typing, which may also vary based on the user's typing behavior. More specifically, some users may unknowingly or subconsciously increase the force used to depress keys when the tactile response is set to require greater downward force to register keystrokes. Other users may respond to the same situation by adjusting the haptic settings to decrease the force required to register keystrokes, thus allowing the user to apply less force while typing.

In each of these embodiments, the output layer of the neural network may include a plurality of values for haptic hardware typing or touch behavior parameters, and optionally, for physical surroundings indicators, application usage data metrics, or user-defined haptic settings. The combination of these values with one another may represent a pattern of values for each of these typing behavior patterns (and optionally indicators, metrics, or settings) likely to be recorded simultaneously with one another, or within a preset time period in which the known, authenticated user identified at block 702 interacts with the piezo haptic keyboard or touchpad in the future. In other words, the combination of node values within the output layer of the neural network may be used to identify when the authorized user is engaging with the piezo haptic keyboard or touchpad in the future.

At block 716, the authenticated user may be associated with the authenticated user personal typing profile created through machine learning in an embodiment. For example, in an embodiment described with respect to FIG. 6, upon identification of a combination of output node values determined to be sufficiently accurate to identify the authenticated user, the keyboard and touchpad user identification system in an embodiment may end the training session, and store the output layer node values for the current iteration in the authenticated user personal typing profile database 780. The stored output layer node values in the authenticated user personal typing profile database 780 may then be associated with the authorized user identified at block 702. The method may then end.

Figure 8:
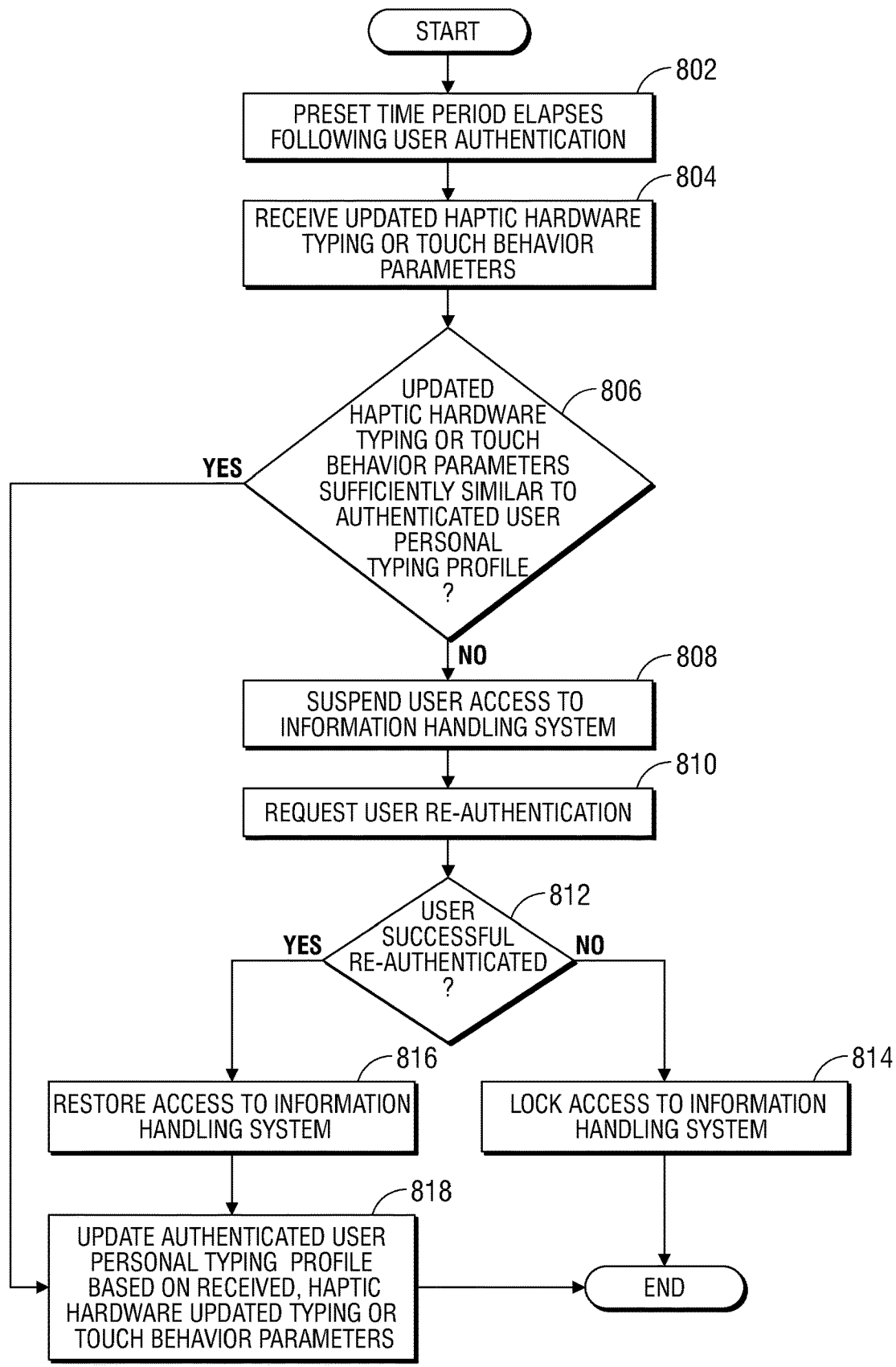
FIG. 8 is a flow diagram illustrating a method of continuously verifying the identification of an authorized user according to an embodiment of the present disclosure.

FIG. 8 is a flow diagram illustrating a method of continuously verifying the identification of an authorized user of an information handling system based on measured user haptic hardware typing or touch behavior parameters according to an embodiment of the present disclosure. As described herein, one-step security systems, such as password protections, provide less secure environments than multi-step authentication systems, or continuously authenticating systems. The keyboard and touchpad user identification system in an embodiment provides such a continuously authenticating system by leveraging monitoring of user typing or touchpad usage behavior employed in the piezo-electric haptic keyboard systems or haptic touchpad systems toward which the market is being driven. The keyboard and touchpad user identification system of the presently disclosed embodiments herein may provide security solely based upon haptics hardware typing parameters such as those of 610 in FIG. 6, solely based upon haptics hardware touchpad usage parameters of 610, or a combination of typing and touch parameters at 610. Thus, use of the term keyboard and touchpad user identification system may include embodiments where only haptic keyboard typing dynamics are used for security identification and as described in FIG. 6, 7, or 8. In other embodiments, the keyboard and touchpad user identification system may refer to security identification according to the embodiments of FIG. 6, 7, or 8 utilizing solely haptic touchpad usage dynamics. In yet other embodiments, a combination of haptic keyboard typing dynamics, haptic touchpad usage dynamics, and other security factors such as physical surrounding indicators and application usage data may be used with the embodiments of security identification of FIG. 6, 7, or 8 and one of skill may appreciate that the factors and selection of factors relating to an authenticated user personal typing profile may be drawn from any of the above.

The keyboard and touchpad user identification system provides such a continuous security by locking access to the information handling system when the current typing behavior does not match that of an authenticated user. For example, an authenticated user may log in to her personal computer, then step away momentarily. If, in such a scenario, another unauthorized user attempts to use that personal computer, the keyboard and touchpad user identification system may record the unauthorized user's typing behavior, determine it does not match the known behavior of the authenticated user, and immediately lock access to the information handling system. In such a way, the keyboard and touchpad user identification system may passively, and continuously secure personal information stored, created, or accessed on the information handling system.

At block 802, a preset time period initiated following identification of an authorized user may elapse. For example, in an embodiment described with reference to FIG. 7, an authorized user may log in at block 702 (or otherwise establish her identity and authority to access the information handling system). Further, the keyboard and touchpad user identification system or typing profile machine learning module in such an embodiment may engage in a training session between blocks 706 and 714 to establish an authenticated user personal typing profile. At the conclusion of this training session, the authorized user may be associated with the authenticated user personal typing profile describing a plurality of haptic hardware typing or touch behavior parameter values for the identified user. The keyboard and touchpad user identification system in an embodiment may retrieve or otherwise access such an authenticated user personal typing profile for the identified user at block 802 after a time period has elapsed since the last typing episode or touch episode in various embodiments.

The keyboard and touchpad user identification system in an embodiment may receive updated haptic hardware typing or touch behavior parameters at block 804. This may begin an ongoing period of continuous authentication, in an embodiment. This period of continuous authentication may occur at any time following termination of the initial time period since a typing or touch episode at 802. In some embodiments, the initial time period since a previous typing or touch episode may not be required and the continuous monitoring may occur upon log in by an authenticated user and the process may begin at 804. During the period of ongoing continuous authentication, the keyboard and touchpad user identification system may receive updated values for each of the haptic hardware typing or touch behavior parameters described with reference to various figures herein. These updated haptic hardware typing or touch behavior parameter values may describe the typing behavior of a current user. In some embodiments, the keyboard and touchpad user identification system may also receive or record physical surroundings indicators, application usage data metrics, or user-defined haptic settings at block 804.

At block 806, the keyboard and touchpad user identification system in an embodiment may determine whether the updated haptic hardware typing or touch behavior parameters match the authenticated user personal typing profile. For example, in an embodiment in which the authenticated user personal typing profile associated with the authenticated user includes a plurality of values for haptic hardware typing or touch behavior parameters, the keyboard and touchpad user identification system may determine whether the updated values (e.g., received at block 804) for each of the haptic hardware typing or touch behavior parameters represented in the personal typing profile match the values given in the authenticated user personal typing profile. The keyboard and touchpad user identification system in an embodiment may determine a match has occurred when the profile value and the updated value for a given haptic hardware typing or touch behavior parameter fall within a preset threshold percentage of one another, for example. In another embodiment, the keyboard and touchpad user identification system may determine a match has occurred when the profile value and the updated value for a majority of haptic hardware typing or touch behavior parameters, or a preset threshold percentage of haptic hardware typing or touch behavior parameters fall within the preset threshold percentage of one another. In still another embodiment the personal typing profile may also include values for physical surroundings indicators, application usage data metrics, or user-defined haptic settings. In such embodiments, the keyboard and touchpad user identification system may determine a match has occurred only if the profile value and the updated value for one or more of these physical surroundings indicators, application usage data metrics, or user-defined haptic settings also falls within the present threshold percentage of one another. If the updated haptic hardware typing or touch behavior parameters, or other indicators, metrics, or settings given in the personal typing profile match the corresponding values within the authenticated user personal typing profile, the method may proceed to block 818 for updating of the authenticated user personal typing profile. If the updated haptic hardware typing or touch behavior parameters, or other security factors such as indicators, physical surroundings indicators, application usage data, metrics, or settings given in the personal typing profile do not match the corresponding values of haptic hardware typing or touch behavior parameters or security factors within the authenticated user personal typing profile, the method may proceed to block 808 to restrict access to the information handling system.

The keyboard and touchpad user identification system in an embodiment in which the updated haptic hardware typing or touch behavior parameters do not match the authenticated user personal typing profile for an authorized user may suspend user access to the information handling system at block 808. This may occur, for example, when an authorized user has gained access to the information handling system, steps away momentarily, and an unauthorized user attempts to access the information handling system before the authorized user is logged out. In such a scenario, the unauthorized user may effectively circumvent the initial security requirement of user identification, because the unauthorized user accesses the system following positive identification of the authorized user, but prior to that user being logged out. The keyboard and touchpad identification system in such an embodiment may detect the updated haptic hardware typing or touch behavior parameters do not match the haptic hardware typing or touch behavior parameters associated with the authorized user that had previously logged in, and determine a security breach may be in progress. In response, the keyboard and touchpad identification system may suspend all access to the information handling system until the user can be reauthenticated. In such a way, the keyboard and touchpad user identification system may continuously and passively ensure it is the authorized user accessing the information handling system, rather than an unauthorized user.

At block 810, the keyboard and touchpad user identification system in an embodiment may request user re-authentication. As described herein, a change in haptic hardware typing or touch behavior parameters may indicate a change of users. However, in some scenarios, a change in haptic hardware typing or touch behavior parameters may not be caused by a change in users, but rather, be caused by a change in the user's environment. For example, users may type differently when stationary versus travelling, or when well-rested versus fatigued. If the training session during which the authenticated user personal typing profile was created occurred when the user was well-rested, for example, and the updated haptic hardware typing or touch behavior parameters were received at block 804 while the user was fatigued, the keyboard and touchpad user identification system may determine at block 806 that the updated haptic hardware typing or touch behavior parameter values do not match the values given in the personal typing profile for that user, despite the fact that the authorized user is, in fact, using the keyboard and touchpad. By prompting the user for re-authentication, the keyboard and touchpad user identification system in an embodiment may determine whether it is the user's identity, or the user's environment that has caused the mismatch between the updated haptic hardware typing or touch behavior parameters and the personal typing profile. The keyboard and touchpad user identification system in an embodiment may not allow the current user to access the information handling system until responding to further prompts for identification. In other embodiments, the keyboard and touchpad user identification system may additionally obscure information previously displayed on the digital display of the information handling system.

The keyboard and touchpad user identification system in an embodiment may determine at block 812 whether the user is successfully re-authenticated. The user should be capable of providing authentication that she is authorized to access the information handling system when the mismatch between the updated haptic hardware typing or touch behavior parameter values and the personal typing profile for that user is caused by a change in the user's environment. If the current user cannot provide authenticating credentials, the method may proceed to block 814 to lock access to the information handling system. If the user successfully provides authenticating credentials, the method may proceed to block 816, for restoration of the user's access to the information handling system.

At block 814, in an embodiment in which the current user cannot provide identifying information establishing she is the previously authenticated user, the keyboard and touchpad user identification system may lock access to the information handling system. This may include logging the previously authorized and identified user out. In some embodiments, this may further include automatically shutting down the information handling system, encrypting data, or engaging in one or more lock down protocols known in the art (e.g., erasure of hard drives). The method may then end. In such a way, the keyboard and touchpad user identification system may ensure security of information when it is detected an unauthorized user has gained access to the information handling system following authentication of an authorized user, but prior to such an authorized user being logged out. This method of monitoring haptic hardware typing or touch behavior parameter values and comparing them against personal typing profiles for known, authorized users in an embodiment may performed repeatedly, continuously, and passively, during the user of the piezo-electric haptic keyboard. In such a way, the keyboard and touchpad user identification system may provide a secondary layer of security continuously, and passively.

The keyboard and touchpad user identification system in an embodiment in which the user provides authenticating identification may restore access to the information handling system 816. For example, in an embodiment in which the keyboard and touchpad user identification system disallows the current user to interact with the information handling system, other than to respond to the prompt for user re-authentication at block 810, the keyboard and touchpad user identification system may grant the user full access to the information handling system. In another embodiment in which the keyboard and touchpad user identification system obscures information previously viewable on the digital display, the keyboard and touchpad user identification system may restore the current user's ability to view that information.

At block 818, the keyboard and touchpad user identification system in an embodiment may update the authenticated user personal typing profile of the authenticated user based on received, updated haptic hardware typing or touch behavior parameters. The keyboard and touchpad user identification system in an embodiment may perform such an update by adjusting the weight matrices associated with one or more nodes within the neural network model associated with the personal typing profile. As described herein, each of the weight matrices in such a multi-layered neural network model may reflect the strength of an assumption that a given haptic hardware typing or touch behavior parameter value (or optionally physical surroundings indicators, application usage data metrics, or user-defined haptic settings) or combination thereof may uniquely identify a given user. As the frequency with which a particular node value occurs increases, the strength of the assumption that the user is associated with that value should also increase. Thus, the weight matrix associated with that particular node value may be adjusted to reflect this increased confidence, as that value continues to reoccur. In contrast, weight matrices associated with node values occurring only infrequently, or varying widely over time may be adjusted to reflect lowered confidence in the assumption that the user is associated with that value.

For example, the updated haptic hardware typing or touch behavior parameter values received at block 804 in an embodiment may match values within the authenticated user personal typing profile for an authorized user. In such a scenario, the keyboard and touchpad user identification system may adjust the weight matrices associated with the nodes holding these values to reflect a greater likelihood that these values are uniquely associated with the authorized user. As another example, the updated haptic hardware typing or touch behavior parameter values received at block 804 may not match values within the authenticated user personal typing profile for an authorized user, despite the fact that the authorized user is still using the keyboard or touchpad if the user's environment has changed. More specifically, the training session may have occurred when the user was well-rested, for example, and the updated haptic hardware typing or touch behavior parameters may have been received while the same user was fatigued. Upon successfully providing authenticating identification at block 812 in such an embodiment, the keyboard and touchpad user identification system may update the weight matrices within the neural network to reflect that the node values for that user may vary over time and with respect to certain surrounding conditions. In such a way, the keyboard and touchpad authentication system may continuously update and learn the user's behavior, in the context of the user's environment, as reflected by physical surroundings indicators, application usage data metrics, and user-defined haptic settings in order to more accurately identify authorized users in the future. The method may then end.

The blocks of the flow diagrams of FIGS. 7-8 or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A piezo haptic keyboard and touchpad user identification system of an information handling system comprising:
    a processor receiving an authenticating user input identifying an authorized user of the information handling system;
    a piezo haptic keyboard controller operably connected to a plurality of piezo electric elements situated beneath a plurality of keys of the piezo haptic keyboard and beneath a touchpad;
    the piezo haptic keyboard controller detecting initial haptic hardware typing or touch behavior parameters describing characteristics of a plurality of deformations of the plurality of piezo electric elements during an initial period of interaction between the authorized user and the piezo haptic keyboard and the touchpad;
    the processor executing machine readable code instructions to:
        identify, via machine learning, an initial repeated pattern of an initial set of values for a combination of a plurality of the initial haptic hardware typing or touch behavior parameters reoccurring during the initial period of interaction between the authorized user and the piezo haptic keyboard and the touchpad; and
        associate the initial repeated pattern of the initial set of values for the combination of the plurality of the initial haptic hardware typing or touch behavior parameters with the authorized user as an authorized user personal typing profile.

2. The piezo haptic keyboard and touchpad user identification system of claim 1 further comprising:
    the processor receiving a physical surroundings indicator from an operably connected environmental sensor during the initial period of interaction between the authorized user and the piezo haptic keyboard and the touchpad; and
    wherein the initial repeated pattern of the initial set of values further includes a value for the physical surroundings indicator.

3. The piezo haptic keyboard and touchpad user identification system of claim 2, wherein the physical surroundings indicator is a measurement of ambient light.

4. The piezo haptic keyboard and touchpad user identification system of claim 1 further comprising:
    the processor recording a software application usage metric during the initial period of interaction between the authorized user and the piezo haptic keyboard and the touchpad; and
    wherein the initial repeated pattern of the initial set of values includes the software application usage metric indicating an operating software application.

5. The piezo haptic keyboard and touchpad user identification system of claim 1 further comprising:
    the processor receiving a user-defined haptic keyboard setting during the initial period of interaction between the authorized user and the piezo haptic keyboard and the touchpad; and
    wherein the initial repeated pattern of the initial set of values includes the user-defined haptic keyboard setting.

6. The piezo haptic keyboard and touchpad user identification system of claim 1 further comprising:
    the piezo haptic keyboard controller detecting an updated haptic hardware typing or touch behavior parameter value during a later period of interaction between the authorized user and the piezo haptic keyboard and the touchpad;
    the processor determining the updated haptic hardware typing or touch behavior parameter value differs from a value for a corresponding initial haptic hardware typing or touch behavior parameter in the initial repeated pattern of the authorized user personal typing profile by a preset threshold percentage; and
    the processor denying access to the information handling system.

7. The piezo haptic keyboard and touchpad user identification system of claim 6 further comprising:
    the processor prompting and receiving an updated authenticating user input identifying an authorized user of the information handling system; and
    the processor restoring access to the information handling system.

8. A method of user identification based on piezo haptic keyboard and touchpad operation dynamics comprising:
    detecting, via a piezo haptic keyboard controller operably connected to a plurality of piezo electric elements situated beneath a plurality of keys of a piezo haptic keyboard and beneath a touchpad, a recorded haptic hardware typing or touch behavior parameter value describing interaction between a user and a piezo haptic keyboard or a touchpad;
    determining, via a processor, that the recorded haptic hardware typing or touch behavior parameter value differs by a preset threshold percentage from a preset haptic hardware typing or touch behavior parameter value within an authenticated user personal typing profile associated with an authenticated user;
    wherein the authenticated user personal typing profile includes an initial repeated pattern of an initial set of values for a combination of a plurality of initial haptic hardware typing or touch behavior parameters identified by the processor, via machine learning; and denying the user access to the information handling system.

9. The method of claim 8 further comprising:

prompting and receiving, via a graphical user interface, an updated authenticating user input identifying an authorized user of the information handling system; and restoring access of the information handling system to the user.

10. The method of claim 8, wherein the haptic hardware typing or touch behavior parameters describe a location on the piezo electric element of a downward force applied by the authorized user to deform one of the plurality of piezo electric elements.

11. The method of claim 8, wherein the haptic hardware typing or touch behavior parameters describe a duration of a downward force applied by the authorized user to deform one of the plurality of piezo electric elements.

12. The method of claim 8, wherein the haptic hardware typing or touch behavior parameters describe a typing speed.

13. The method of claim 8, wherein the haptic hardware typing or touch behavior parameters describe a placement of the palms of the user with respect to the piezo electric element.

14. The method of claim 8, wherein the haptic hardware typing or touch behavior parameters describe a repeated erroneous stroke for a specific key within the piezo haptic keyboard.

15. A piezo haptic keyboard and touchpad user identification system of an information handling system comprising:

a processor receiving an authenticating user input identifying an authorized user of the information handling system;

a piezo haptic keyboard controller operably connected to a plurality of piezo electric elements situated beneath a plurality of keys of the piezo haptic keyboard and beneath a touchpad;

the piezo haptic keyboard controller detecting initial haptic hardware typing or touch behavior parameters describing characteristics of a plurality of deformations of the plurality of piezo electric elements during an initial period of interaction between the authorized user and the piezo haptic keyboard and the touchpad;

the processor executing machine readable code instructions to:

identify, via machine learning, an initial repeated pattern of an initial set of values for a combination of a plurality of the initial haptic hardware typing or touch behavior parameters reoccurring during the initial period of interaction between the authorized user and the piezo haptic keyboard and the touchpad;

associate the initial repeated pattern with the authorized user in an authenticated user personal typing profile;

the piezo haptic keyboard controller detecting an updated haptic hardware typing or touch behavior parameter value during a later period of interaction between the authorized user and the piezo haptic keyboard and the touchpad;

the processor determining the updated haptic hardware typing or touch behavior parameter value differs from a value for a corresponding initial haptic hardware typing or touch behavior parameter in the initial repeated pattern by a preset threshold percentage; and the processor denying access to the information handling system.

16. The piezo haptic keyboard and touchpad user identification system of claim 15 further comprising:

the processor prompting and receiving an updated authenticating user input identifying an authorized user of the information handling system; and the processor restoring access to the information handling system and update the authenticated user personal typing profile.

17. The piezo haptic keyboard and touchpad user identification system of claim 16 further comprising:

the processor identifying, via machine learning, an updated repeated pattern of an updated set of values for a combination including a plurality of the initial haptic hardware typing or touch behavior parameters and the updated haptic hardware typing or touch behavior parameters; and the processor associating the authorized user with the updated repeated pattern.

18. The piezo haptic keyboard and touchpad user identification system of claim 15, wherein the initial haptic hardware typing or touch behavior parameters describe the authenticated user routinely striking a space bar within the piezo haptic keyboard twice following a stroke of a period key within the piezo haptic keyboard.

19. The piezo haptic keyboard and touchpad user identification system of claim 15, wherein the initial haptic hardware typing or touch behavior parameters describe a time period elapsing between clicks of a double click of the touchpad.

20. The piezo haptic keyboard and touchpad user identification system of claim 15, wherein the initial haptic hardware typing or touch behavior parameters describe a downward force applied by the authorized user to deform one of the plurality of piezo electric elements.

* * * * *